United States Patent
Nishimura et al.

(10) Patent No.: US 6,299,497 B1
(45) Date of Patent: Oct. 9, 2001

(54) METHOD OF MANUFACTURING AN ELECTRON SOURCE AND IMAGE-FORMING APPARATUS USING THE ELECTRON SOURCE

(75) Inventors: Michiyo Nishimura, Sagamihara; Hisaaki Kawade, Yokohama; Kazuya Miyazaki, Atsugi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/321,538

(22) Filed: May 28, 1999

Related U.S. Application Data

(62) Division of application No. 08/998,429, filed on Dec. 24, 1997, now Pat. No. 6,208,071.

(30) Foreign Application Priority Data

Dec. 26, 1996 (JP) .................................................. 8-347929
Dec. 26, 1996 (JP) .................................................. 8-347930
Dec. 26, 1996 (JP) .................................................. 8-347933

(51) Int. Cl.$^7$ ................................. H01J 9/00; H01J 9/24
(52) U.S. Cl. ................................................ 445/24; 445/50
(58) Field of Search .................................. 445/24, 25, 49, 445/50, 51; 313/309, 336, 351; 257/10

(56) References Cited

U.S. PATENT DOCUMENTS

| 3,632,438 | * | 1/1972 | Carlson et al. | .................. | 257/10 |
| 4,846,868 | | 7/1989 | Aratani | .................. | 65/30.14 |
| 5,646,479 | * | 7/1997 | Troxell | .................. | 313/495 |

FOREIGN PATENT DOCUMENTS

| 0 716 333 | 6/1996 | (EP) . |
| 0 791 563 | 8/1997 | (EP) . |
| 0 793 132 | 9/1997 | (EP) . |
| 2 696 443 | 4/1994 | (FR) . |
| 2 236 317 | 4/1991 | (GB) . |
| 8-162001 | 6/1996 | (JP) . |

OTHER PUBLICATIONS

W. P. Dyke, et al., "Field Emission", Advances in Electronics and Electron Physics, vol. 8, (1956), pp. 89–185.
C. A. Spindt, et al., "Physical Properties of Thin–Film Field Emission . . . Molybdenum Cones", J. Appl. Phys., vol. 47, (1976), pp. 5248–5263.
C. A. Mead, "Operation of Tunnel–Emission Devices", J. Appl. Phys., vol. 32, No. 4, (1961), pp. 646–652.
M. I. Elinson, et al., "The Emission of Hot Electrons and the . . . from Tin Oxide", Radio Eng. Electron Phys., vol. 10, (1965), pp. 1290–1296.
G. Dittmer, "Electrical Conduction and Electron Emission of Discontinuous Thin Films", Thin Solid Films, vol. 9, (1972) pp. 317–328.
M. Hartwell, et al., "Strong Electron Emission from Patterned Tin–Indium Oxide Thin Films", IEEE Trans. ED Conf., (1975), pp. 519–521.
H. Araki, et al., "Electroforming and Electron Emission of Carbon Thin Films", Vacuum, vol. 26, No. 1, (1983), pp. 22–29.
Patent Abstracts of Japan, vol. 97, No. 5, May 30, 1977 (with respect to JP 9–17333 of Jan. 17, 1997).
Patent Abstracts of Japan, vol. 12, No. 68 (P–672), Mar. 3, 1988 (with respect to JP 62–209414 of Sep. 14, 1987).

* cited by examiner

Primary Examiner—Nimeshkumar D. Patel
Assistant Examiner—Joseph Williams
(74) Attorney, Agent, or Firm—Fitzpatrick, Cella, Harper & Scinto

(57) ABSTRACT

A sodium-containing glass substrate has a modified surface on which an electroconductive film is to be formed. The modified surface is constituted of a layer of which sodium concentration is lower than the bulk body of the glass substrate, preferably with a sodium content ratio to all the metal elements of not greater than 2 atomic percent. The modified surface may contain a reduced amount of sulfur as compared to the bulk body of the glass substrate.

31 Claims, 21 Drawing Sheets

METHOD OF MANUFACTURING AN ELECTRON SOURCE AND IMAGE-FORMING APPARATUS USING THE ELECTRON SOURCE

This is a divisional of application Ser. No. 08/998,429, filed Dec. 24, 1997 now U.S. Pat. No. 6,208,071.

BACKGROUND OF THE INVENTION

1. Field of the Invention

This invention relates to a substrate for an electron source that can suitably be used for an image-forming apparatus such as a display apparatus.

2. Related Background Art

There have been known two types of electron-emitting devices; the thermionic electron source and the cold cathode electron source. Cold cathode electron sources refer to the field emission type (hereinafter referred to as the FE type), the metal/insulation layer/metal type (hereinafter referred to as the MIM type) and the surface conduction electron-emitting type. Examples of FE type device include those proposed by W. P. Dyke & W. W. Dolan, "Field emission", Advances in Electronics and Electron Physics, 8, 89 (1956) and C. A. Spindt, "Physical Properties of thin-film field emission cathodes with molybdenum cones", J. Appl. Phys., 47, 5248 (1976). Examples of MIM type devices are disclosed in papers including C. A. Mead, "Operation of Tunnel-Emission Devices", J. Appl. Phys., 32, 646 (1961). Examples of surface-conduction electron-emitting devices include the one proposed in M. I. Elinson, Radio Eng. Electron Phys., 10, 1290 (1965).

An surface-conduction electron-emitting device is realized by utilizing the phenomenon that electrons are emitted out of a thin film with a small area formed on a substrate when an electric current is forced to flow in parallel with the film surface. While Elinson proposes the use of $SnO_2$ thin film for a device of this type, the use of Au thin film [G. Dittmer: "Thin Solid Films", 9, 317 (1972)], the use of $In_2O_3/SnO_2$ thin film [M. Hartwell and C. G. Fonstad: "IEEE Trans. ED Conf.", 519 (1975)] and the use of carbon thin film [H. Araki et al.: "Vacuum", Vol. 26, No. 1, p. 22 (1983)] are also proposed. The applicant of the present patent application has proposed a number of improvements to surface-conduction electron-emitting devices.

FIGS. 19A and 19B of the accompanying drawings schematically illustrate a typical surface conduction electron-emitting device. FIG. 19A is a plan view and FIG. 19B is a cross sectional view. Referring to FIGS. 19A and 19B, it comprises a substrate 1, a pair of device electrodes 2 and 3 oppositely arranged on the substrate and a electroconductive film 4 connecting the device electrodes 2 and 3 and having an electron-emitting region 5 as part thereof. Conventionally, an electron-emitting region 5 is produced in a surface conduction electron-emitting device by subjecting the electroconductive film 4 of the device to an electrically energizing process, which is referred to as energization forming. In the energization forming process, a voltage is applied to the device electrode pair 2 and 3 that are connected by the electroconductive film 4 to partly destroy, deform or transform the film and produce an electron-emitting region 5 which is electrically highly resistive. Thus, the electron-emitting region 5 is part of the electron-emitting region-forming thin film 4 that typically contains a fissure therein so that electrons may be emitted from the fissure and its vicinity. While the voltage used for the energization forming may be a DC voltage or a voltage that gradually rises, a pulse voltage is preferably used to produce a device that operates satisfactorily for electron emission. A pulse voltage may have a constant wave height or a height that gradually rises depending on the circumstances under which the device is prepared.

In order to produce an electron-emitting region by means of energization forming that shows desired electron emitting characteristics, the electroconductive film is preferably made of electroconductive fine particles. While an electroconductive film may be formed from electroconductive fine particles in many different ways, in a known method, a solution containing an organic metal compound is applied to the surface of a substrate to produce a film of the organic metal compound there, which is then subjected to a heat treatment to produce an electroconductive film comprising fine particles of metal and/or metal compound. This technique is advantageous particularly in terms of manufacturing cost because, unlike a gas deposition method, it does not require the use of a large vacuum system. There is also known a method with which the solution is applied only to areas for forming a film by means of an ink-jet system. This method is advantageous in that it does not require an independent step of patterning the electroconductive film.

The electroconductive film of a surface-conduction electron-emitting device may be made of PdO fine particles prepared by heat treating an organic compound of palladium in the atmosphere. The heat treatment is typically conducted at 300 to 400° C. for a little more than 10 minutes. PdO is a substance that shows an appropriate electroconductivity and hence is suited for an electron-emitting region that is produced by energization forming. Additionally, PdO can easily be reduced to produce Pd when it is heated in a vacuum or exposed to reducing gas. After producing an electron-emitting region in an electroconductive film by energization forming, the electric resistance of the electroconductive film can be lowered by two digits by reducing the PdO to Pd. There are cases where a surface-conduction electron-emitting device having an electron-emitting region operates better when the electroconductive film shows a low electric resistance. The PdO will be reduced advantageously in such a case.

The applicant of the present patent application has also proposed various electron sources prepared by arranging a number of electron-emitting devices of the above described type on a substrate and image-forming apparatus comprising such an electron source. In order to arrange an electron source in a vacuum envelope, the electron source and the envelope have to be firmly bonded with other components. The bonding operation is generally carried out by means of frit glass and by heating them to about 400 to 500° C. for a period between 10 minutes and an hour depending on the size of the envelope and other factors so that the frit glass may be molten to firmly hold them together.

The envelope is preferably made of glass containing sodium such as soda lime glass that can be easily bonded with frit glass. The use of soda lime glass is particularly advantageous because it is not expensive. It is also preferable that the substrate is made of soda lime glass because it has to show a thermal expansion coefficient close to that of the envelope and should be bonded reliably to the envelope.

However, a substrate made of soda lime glass can be accompanied by the following problems.

Firstly, soda lime glass contains alkali metals, particularly sodium (Na) in the form of $Na_2O$, to a large extent. Since sodium can be easily diffused by heat, the sodium contained in the substrate of soda lime glass is diffused into various components of the image-forming apparatus during the processes where the substrate is exposed to high temperature to adversely affect the components.

Additionally, the substrate of the electron source is exposed to higher temperature when it is bonded to the envelope by means of frit glass so that the sodium diffusion becomes even more remarkable to aggravate the adverse effect.

However, the use of a material other than soda lime glass, quartz for example, has to be avoided because such a material is costly and provides additional problems including the difficulty of bonding.

A technique that has been proposed to bypass the above problems is to form an SiN (Japanese Patent Application Laid-Open No. 8-162001) or $SiO_2$ film on the surface of the soda lime glass substrate by means of sputtering. However, stress can be generated between the soda lime glass substrate and the SiN or $SiO_2$ film that can eventually separate them particularly if the SiN or $SiO_2$ film is thick. On the other hand, a thin SiN or $SiO_2$ film cannot satisfactorily suppress the sodium diffusion when it is exposed to high temperature for a long time during the process of manufacturing an electron source.

Additionally, a sputtering operation for forming an SiN or $SiO_2$ film requires the use of a large sputtering system relative to the size of the substrate and consequently raises the manufacturing cost.

Therefore, there is a strong demand for a technology of effectively avoiding the adverse effect of sodium diffusion.

A similar problem is caused by diffusion of sulfur from the substrate and measures for preventing sulfur diffusion is also sought.

SUMMARY OF THE INVENTION

An object of the present invention is to provide an electron source that can minimize the variances and degradation in the performance of its surface-conduction electron-emitting devices.

Another object of the present invention is to provide an image-forming apparatus that can produce images with an enhanced level of uniformity in terms of brightness and resolution.

Still another object of the invention is to provide a method of manufacturing such an electron source and image-forming apparatus comprising such a substrate.

According to a first aspect of the invention, there is provided a sodium containing substrate to be used for producing the electron source and the image-forming apparatus mentioned above, characterized in that the sodium concentration of the substrate is reduced as a function of the distance from the surface for carrying electron-emitting devices.

According to another aspect of the invention, there is provided an electron source comprising a substrate and electron-emitting device arranged on the surface of said substrate, characterized in that the substrate contains sodium and the sodium concentration of the substrate is reduced as a function of the distance from the surface for carrying the electron-emitting devices.

According to still another aspect of the invention, there is provided an image-forming apparatus comprising a substrate, electron-emitting devices arranged on the surface of the substrate and an image-forming member for forming images as irradiated with electrons emitted from the electron-emitting devices, characterized in that the substrate contains sodium and the sodium concentration of the substrate is reduced as a function of the distance from the surface for carrying the electron-emitting devices.

According to a further aspect of the invention there is provided a method of manufacturing an electron source comprising a substrate and electron-emitting devices arranged on the surface of said substrate, characterized in that it comprises a step of forming the electron-emitting devices on the substrate that contains sodium, the sodium concentration of the substrate being reduced as a function of the distance from the surface for carrying the electron-emitting devices.

According to a still further aspect of the invention, there is provided a method of manufacturing an image-forming apparatus comprising a substrate, electron-emitting devices arranged on the surface of the substrate and an image-forming member for forming images as irradiated with electrons emitted from the electron-emitting devices, characterized in that it comprises a step of forming the electron-emitting devices on the substrate that contains sodium, the sodium concentration of the substrate being reduced as a function of the distance from the surface for carrying the electron-emitting devices.

BRIEF DESCRIPTION OF THE DRAWINGS

FIGS. 18A, 18B, 19C, 18D and 18E are schematic partial cross sectional views of the electron source FIG. 17, showing different manufacturing steps.

DETAILED DESCRIPTION OF THE PREFERRED EMBODIMENTS

The present invention is an achievement based on the finding that the electron-emitting devices that are arranged on the substrate of an electron source and comprise an electroconductive film disposed between a pair of device electrodes and having therein an electron-emitting region are accompanied by the following problems. For the purpose of the invention, an electron-emitting device is preferably a surface-conduction electron-emitting device and, therefore, the problems will be discussed below in terms of a surface-conduction electron-emitting device.

Soda lime glass contains alkali metals particularly sodium (Na) in the form of $Na_2O$, to a large extent. Since sodium can be easily diffused by heat, the sodium contained in the substrate of soda lime glass will be diffused into the electroconductive film of the electron-emitting device during the processes where the substrate is exposed to high temperature to adversely affect its performance.

In the process of manufacturing an electron-emitting device, wherein an organic metal compound is heat-treated to produce a film of metal oxide, the device is exposed to a temperature between 300 and 400° C. for more than ten minutes so that Na can be diffused into the electroconductive film during this period.

Figure 20:
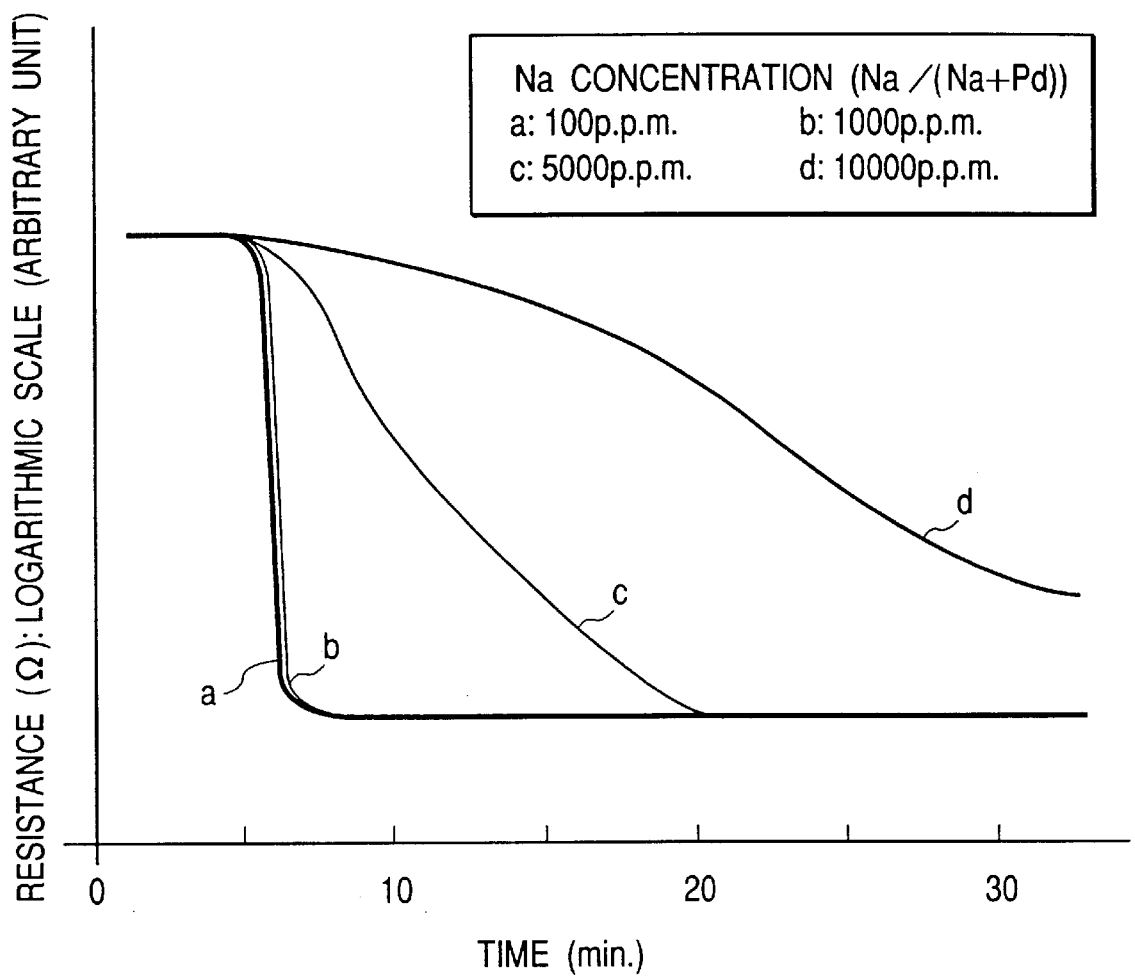
FIG. 20 is a graph schematically illustrating the rate of reducing reaction of an electroconductive film as a function of the Na content.

If the electroconductive film is made of an electroconductive metal oxide such as PdO, the electroconductive film is more often than not subjected to a reducing process to lower its electric resistance after an energization forming process. This reduction process can be decelerated when the PdO film contains Na to a large extent. The deceleration of the reaction speed is strongly affected by a high Na concentration so that it is difficult to produce a large number of electron-emitting devices that operate uniformly if the electroconductive film contains Na to a large extent. In a series of preliminary experiments, the inventors of the present invention found that the reduction process is not significantly decelerated when the Na concentration in the PdO film is less than 1,000 p.p.m. in terms of the molar ratio of the metal elements of the PdO film but the time required for the reduction process to be completed increases remarkably beyond that level. FIG. 20 shows the change with time of the electric resistance of an electroconductive film when it is exposed to a $H_2$:2%—Na:98% mixture gas for a reducing reaction. It was also found in the preliminary experiments that the ratio of Na to the overall metal content (mainly of Na, K, Ca and Mg—for the purpose of convenience, Si and P will also be referred to as metal elements if they are contained in the substrate) should be less than 2 at % on the surface of the substrate to keep the Na concentration below 1,000 p.p.m. The Na concentration on the surface of the substrate is determined with SIMS by a method described below.

It should be noted that not only Na but also sulfur (S) contained in the substrate can affect the reduction process. While it is not clear how S affects the reduction process, the following theory may be an acceptable one. As S enters the PdO film, they react with each other to produce PdS, which will not be reduced significantly. However, this cannot convincingly explain the effect of S on the reduction process because the S content of the substrate is low. Therefore, a thin film of PdS that is difficult to reduce may be formed on the surface of the PdO particles of the electroconductive film to deter the progress of the reduction process. Anyway, even a small amount of sulfur contained in the substrate can significantly affect the performance of the electron-emitting device so that the S content of the substrate should desirably be held as low as possible or at least under a level that can be detected by simple and practical detection means. More specifically, the S content is preferably less than 0.1 at % (the ratio of the number of S atoms to the number of all the atoms within the superficial layer of the substrate between the surface and 5 nm therebelow) that represents the detectable lower limit of ordinary simple X-ray photoelectron spectrometry adapted to quantification.

Anyway, if the electroconductive films of the electron-emitting devices of an electron source are reduced to different extents, different voltages may be applied to their electron-emitting regions so as to drive the electron-emitting regions differently for electron emission. Additionally, if the electroconductive films are reduced insufficiently and remain electrically resistive, the emission current of the devices can be inadequately low.

The substrate, the envelope and other components of the electron source are subjected to even higher temperature when they are bonded together by means of frit glass so that Na (and S) can be diffused into the electroconductive films of the electron-emitting devices to a greater extent to aggravate the problem.

However, the use of a material other than soda lime glass, quartz for example, has to be avoided because such a material is costly and provides additional problems including the difficulty of bonding.

A technique that has been proposed to bypass the above problems is to form an SiN or $SiO_2$ film on the surface of the soda lime glass substrate by means of sputtering. However, stress can be generated between the soda lime glass substrate and the SiN or $SiO_2$ film that can eventually separate them particularly if the SiN or $SiO_2$ film is thick. On the other hand, a thin SiN or $SiO_2$ film cannot satisfactorily suppress the sodium diffusion when it is exposed to high temperature for a long time during the process of manufacturing an electron source.

Additionally, a sputtering operation for forming an SiN or $SiO_2$ film requires the use of a large sputtering system relative to the size of the substrate to consequently raise the manufacturing cost.

Therefore, there should be provided a method of effectively avoiding the adverse effect of sodium and/or sulfur diffusion into the electroconductive film.

The present invention is based on the above findings and now will be described in terms of preferred modes of carrying it out.

The present invention generally relates to an electron source comprising a substrate and one or more than one electron-emitting devices arranged thereon and comprising a pair of device electrodes and an electroconductive film connecting the electrodes and including an electron-emitting region, and an image-forming apparatus comprising such an electron source as well as to a method of manufacturing such an electron source and an image-forming apparatus. Particularly, the present invention relates to a substrate that characterizes the electron source comprising it. More specifically, according to the invention, there is provided an electron source substrate substantially made of "soda lime glass" and contains $SiO_2$:69–75% and $Na_2O$:10–17%, the balance being $K_2O$, CaO, MgO and other compounds.

A characteristic structural feature of the electron source and the image-forming apparatus of the present invention resides in that the substrate has such a sodium concentration profile in the depth direction in the area carrying the electron-emitting devices that the sodium concentration at the surface is lower than the bulk sodium concentration of the substrate.

Now, characteristic features of the manufacturing process for providing the electron source and the image-forming process of the present invention are described below.

In a first preferred mode of carrying out the invention, a substrate for manufacturing the electron source and the image-forming apparatus of the invention comprises a surface region containing Na to a reduced extent ("de-sodiumized" layer) with a ratio of the Na content to the content of all the metal elements not greater than 2 at %.

For the purpose of the invention, the thickness d of the "de-sodiumized" layer in the initial stages of the substrate of an electron source according to the invention is determined as a function of the heat treatment temperature T(K) and the heat treatment time t(sec.) to which the substrate is exposed in the process of fabricating the electron source or an image-forming apparatus comprising it. According to the invention, the ratio of the Na content to the content of all the metal elements of the layer is held to be not greater than 2 at % if the Na content is raised in the interface of the superficial "de-sodiumized" layer and the electroconductive film by Na diffusion due to the heat treatment.

While the ratio can be determined experimentally, it can also be approximately estimated by means of a one-dimensional diffusion model. If the Na concentration of the substrate main body is Cs, the Na concentration at the interface of the "de-sodiumized" layer and the electroconductive film at time t is C while the "de-sodiumized" layer has a thickness of d and the Na diffusion coefficient in the "de-sodiumized" layer is D, a relationship as defined by equation (1) below is obtained by assuming that the "de-sodiumized" layer practically does not contain Na at all at time t=0 and the Na concentration near the interface of the substrate main body and the "de-sodiumized" layer is invariable.

$$C/Cs = \mathrm{erfc}[d/\{2(Dt)^{1/2}\}] \quad (1)$$

where erfc(x) is an error function complement, which is expressed by equation (2) below.

$$\mathrm{erfc}(x) = 1 - \mathrm{erf}(x) \quad (2)$$

where erf(x) is an error function defined by equation (3) below.

$$\mathrm{erf}(x) = \frac{2}{\sqrt{\pi}} \int_0^x \exp(-y^2) dy \quad (3)$$

When the concentration is not high, the diffusion coefficient D is not dependent on the concentration and expressed by equation (4) below.

$$D = Do\, \exp[-Ea/kT] \quad (4)$$

where Do is a constant, Ea is the activation energy and k is a Boltzmann constant (~$1.38 \times 10^{-23}$). The diffusion constant of Na contained in $SiO_2$ is about $1.0 \times 10^{-21}$(cm$^2$/sec.) at room temperature and about $6.1 \times 10^{-9}$(cm$^2$/sec.) at 450° C. (723K). Thus, Ea=$1.7 \times 10^{-19}$(J) and Do=$1.1 \times 10^{-1}$(cm$^2$/sec.) will be obtained. Then, the thickness of the "de-sodiumized" layer that can withstand the heat treatment can be determined by using these values.

In reality, the Na concentration at the interface will be reduced to some extent as Na is diffused to the "de-sodiumized" layer so that a sufficient effect of "de-sodiumization" can be expected if the thickness is a little less than the value determined by using the above model.

As described above, the "de-sodiumized" layer has to show at the surface of the "de-sodiumized" layer an Na concentration that is 1/10 to 1/15 of the concentration inside the substrate in order for the ratio of the Na content to the content of all the metal elements of the layer to be not greater than 2 at %. Thus, from equation (1) above, the "de-sodiumized" layer may well have a thickness d about 2.4 times of the value of $(Dt)^{1/2}$ above.

If the process of producing an electroconductive film by heat-treating an organic metal compound at 350° C. continues for 10 minutes, the diffusion coefficient will be D=$2.9 \times 10^{-10}$(cm$^2$/sec.) on the basis of the above activation energy so that the "de-sodiumized" layer will have to be about 10 μm thick. The substrate and the envelope normally require a very high temperature for bonding them to each other. Thus, the "de-sodiumized" layer is required to be as thick as about 50 μm if it is exposed to 450° C. for 10 minutes in the operation of bonding the substrate and the envelope to each other.

Taking into account the manufacturing conditions of the electron source and the image-forming apparatus of the present invention, the above parameters for preparing the "de-sodiumized" layer are determined. While soda lime glass with various compositions can be used as a substrate for the purpose of the present invention, the Na content ratio relative to all the metal elements, i.e. Cs in equation (1), is preferably 20 at %. The above-exemplified value of Do is calculated for densely formed $SiO_2$ and in reality, the value of Do may become larger than that value up to a maximum of twice the above-exemplified value. The electroconductive film is formed by thermal decomposition of an organic metal compound at a temperature higher than the decomposition temperature of the organic metal compound. To form an electroconductive film composed of Pd, PdO or a mixture thereof, an organic palladium compound is decomposed to metal Pd at temperatures higher than 250° C., depending on the compound. Further, to oxidize Pd to PdO, a still higher temperature up to 400° C. is needed. For the above treatment, the substrate is usually heated for about 5 to 20 minutes. Thus, the "de-sodiumized" layer must be formed to a thickness of 1–40 μm depending on the conditions. Further, if frit glass is used for bonding components of the image-forming apparatus of the present invention, the components are heated at 400–500° C. for 10–20 minutes and therefore, a "de-sodiumized" layer is required to have a thickness of 20–140 μm. A "de-sodiumized" layer having a larger thickness can of course prevent Na diffusion, but since too large a thickness can raise another problem, the above range for thickness is preferred. If a lower melting frit glass is used for bonding, a thinner "de-sodiumized" layer can be used and accordingly, the thickness value should not be limited to the above range for the purpose of the present invention.

The effect of the "de-sodiumized" layer will be most remarkable when it is formed in the area of the substrate where the electroconductive film is produced for each electron-emitting device, although it may also be effective for suppressing changes in electric properties of components such as wires under certain conditions if it is formed in areas of the substrate where such components are arranged. On the other hand, it is better for the areas of the substrate that are bonded to the components of the envelope not to be provided with a "de-sodiumized" layer because the substrate will be bonded well to the envelope by means of frit glass without such a layer. The substrate can be partly "un-de-sodiumized" by using a mask for the "de-sodiumizing process that covers areas not to be "de-sodiumized"

A substrate can be "de-sodiumized" by utilizing the fact that sodium can move easily within glass and by causing sodium to become deposited on the surface of the substrate in the form of sodium sulfate and washing off the deposited sodium with water. Sodium sulfate can be deposited on the surface of a substrate by heating the substrate to high temperature in a sulfur dioxide ($SO_2$) containing atmosphere or by placing ammonium sulfate on the surface of the substrate and heating the substrate to a high temperature.

The deposited sodium sulfate can be washed off from the substrate with water. After the washing, the "de-sodiumized" layer contains water particularly on the surface and, therefore, it is preferably subjected to a drying process, which is conducted typically at about 120° C. because the sodium contained in the substrate can be diffused into the "de-sodiumized" layer for another time if the temperature of the drying process is too high.

In a second mode of carrying out the invention, a substrate having a sodium-capturing layer is formed on the surface of glass containing sodium such as soda lime glass. For the purpose of the invention, a sodium-capturing layer is a layer made of a material that suppress the diffusion of Na. Materials that can be used for a sodium-capturing layer include glass containing $SiO_2$ as the principal ingredient and also phosphor (P) by about 3 to 10% and glass obtained by partially replacing the Na of soda lime glass with potassium (K). With such a layer, Na atoms in the soda lime glass are prevented from entering the electroconductive films of the electron-emitting devices arranged on the substrate to affect the performance thereof. Techniques that can be used for forming a sodium-capturing layer for the purpose of the invention include thin film deposition techniques such as chemical vapor deposition (CVD) and ion exchange techniques such as one wherein soda lime glass is immersed into molten potassium salt for exchanging Na ions and K ions.

If compared with the first mode, the second mode will be satisfactorily effective with the use of a relatively thin sodium-capturing layer because Na diffuses relatively slowly.

As in the case of the first mode, the areas of the substrate to be bonded to the components of the envelope are not coated with a sodium-capturing layer so that the soda lime glass substrate may be directly held in contact with frit glass.

For the purpose of the invention, the first and second modes may be combined for use.

Figure 21:
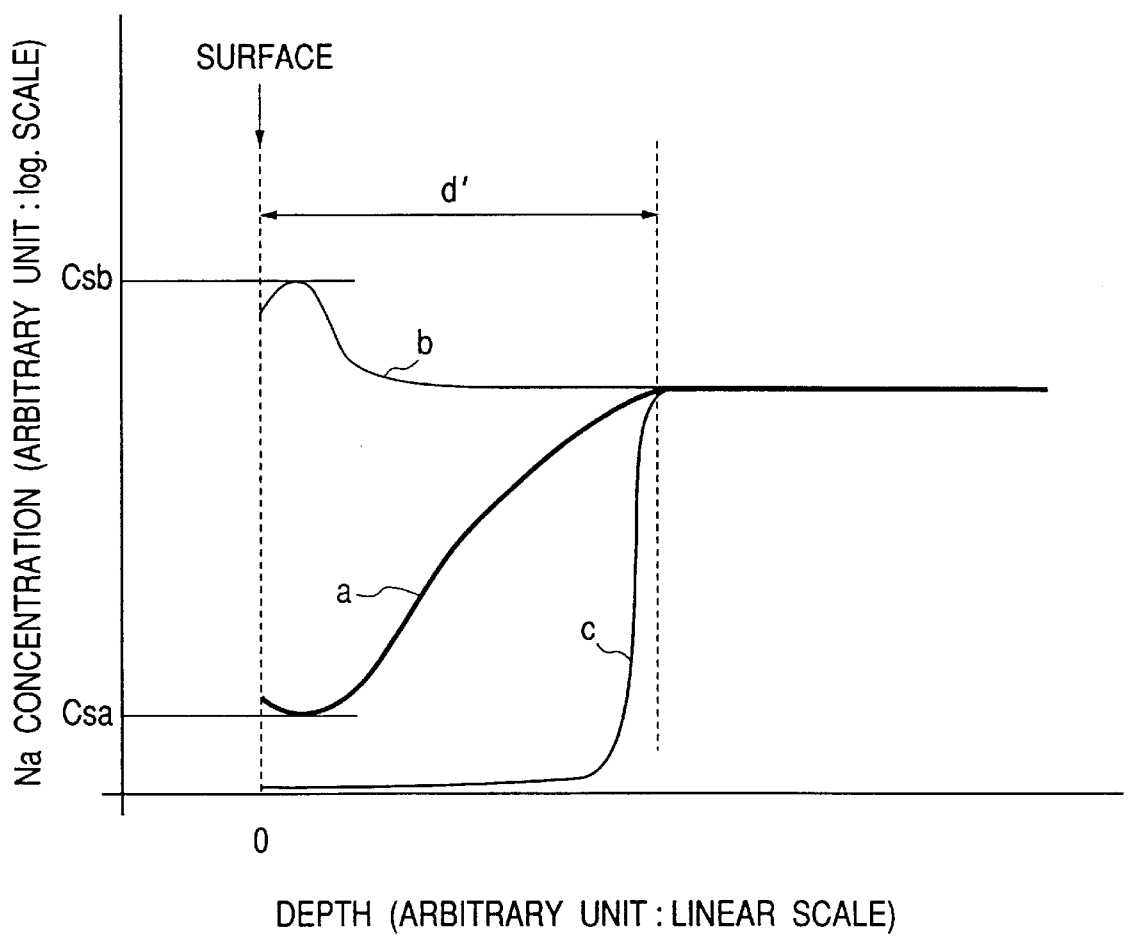
FIG. 21 is a graph schematically illustrating the sodium concentration in the substrate as a function of the distance from the surface.

The Na concentration profile in the depth direction in the area for carrying electron-emitting devices of the substrate as prepared can be determined by, for example, secondary ion mass spectrometry (SIMS). FIG. 21 schematically illustrates such results.

The above Na concentration profile formed as a layer having a lower Na concentration, i.e. a de-sodiumized layer or a Na capturing layer, is not maintained as it is when the substrate has been formed into an electron source or an image-forming device through the aforementioned heating processes.

Curve c in FIG. 21 represents a Na concentration profile immediately after formation of the de-sodiumized layer and the Na capturing layer. In the electron source and the image-forming apparatus of the present invention, the Na concentration profile changes as represented by curve a. The profile has a constant region in the bulk body of the substrate which corresponds to the Na concentration of the glass before forming the de-sodiumized or Na capturing layer, and it is decreased in the vicinity of the surface. The depth d of the region having a decreased Na concentration was not changed by the preparation process.

On the contrary, in the case where the layer having a decreased Na concentration is not formed or is insufficient in thickness for the heating conditions during the preparation process, the Na concentration at the surface of the substrate was higher than that in the bulk body of the substrate, as represented by curve b. This is apparently because Na diffused from the inside toward the surface and deposited in the vicinity of the surface. Though the Na concentration slightly increases in the close proximity of the surface in curve a while slightly decreases in curve b, this is caused by the effect of contamination or cleaning in the measurement and is therefore not essential. Accordingly, the peak value at a depth slightly beneath the surface as represented by Csa and Csb was deemed to be the Na concentration at the surface. While it is somewhat effective for suppressing the adverse effect of Na if the Na concentration at the surface is lower than the bulk body of the substrate, significant effects are expected when the content ratio of Na to all the metal elements at the surface is lower than 2 at %.

In a third mode of carrying out the invention, a "de-sulfurized" layer is formed on the surface of the substrate. Soda lime glass contains sulfur to a small extent, which can decelerate the reducing process or make the latter incomplete if the sulfur, if partly contained in the soda lime glass substrate, moves into the electroconductive film. It should be noted that S may move into the electroconductive film not only from the soda lime glass substrate but also from various sources to contaminate the electroconductive film. Therefore, while a de-sulfurizing operation will have to be conducted in various steps of manufacturing an electron source or an image-forming apparatus according to the invention, the substrate should be de-sulfurized initially. Note that a "de-sodiumizing" process can entail a de-sulfurizing effect so that a de-sulfurizing process can be conducted simultaneously with a "de-sodiumizing" process, although an independent de-sulfurizing process will provide a remarkable effect in some cases. For the purpose of the invention, a de-sulfurized layer preferably has a sulfur concentration of not greater than 0.1 at % and a thickness not less than 0.01 µm. Sulfur can adversely affect the substrate if it is not made of soda lime glass containing sodium to a large extent. If such is the case, the substrate should be treated for de-sulfurization if it is not made of soda lime glass.

Figure 1A:
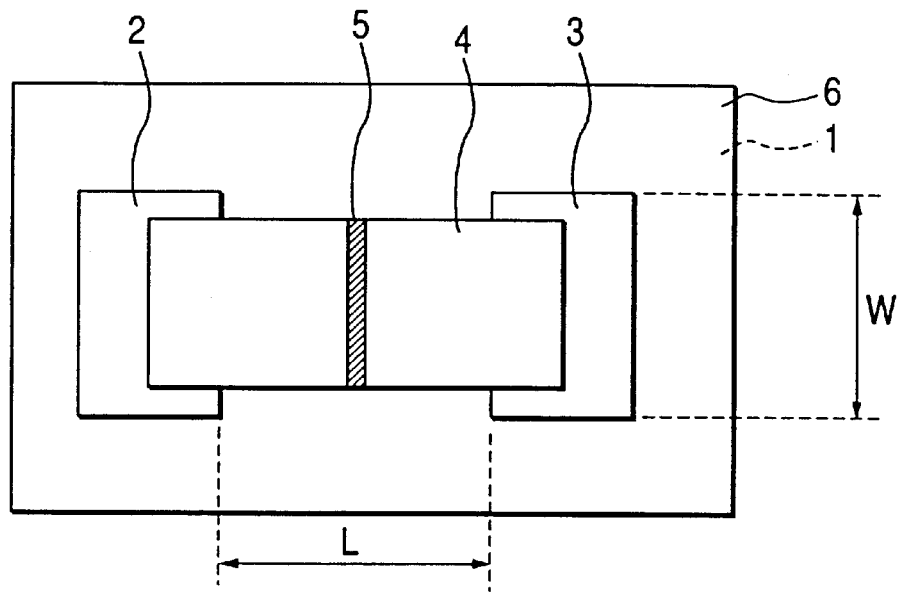
FIG. 1A is a schematic plan view of an electron-emitting device that can be used for the purpose of the invention.
Figure 1B:
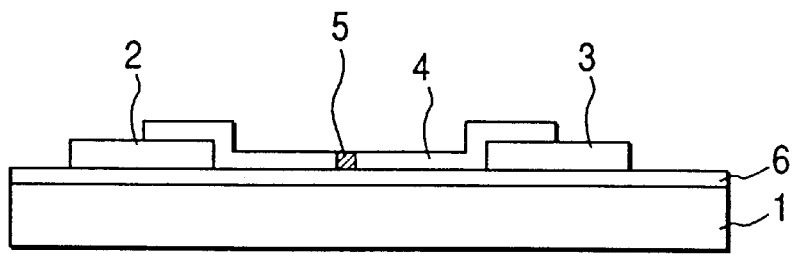
FIG. 1B is a schematic cross sectional view of the electron-emitting device of FIG. 1A.

Now, an electron-emitting device to be used for the purpose of the invention will be described along with a method of manufacturing it. FIGS. 1A and 1B show a schematic plan view and a schematic cross sectional view thereof. Referring to FIGS. 1A and 1B, the device comprises a substrate 1, a pair of device electrodes 2 and 3, an electroconductive film 4 and an electron-emitting region 5. Reference numeral 6 denotes a "de-sodiumized" layer, a sodium-capturing layer, a multilayer structure obtained by combining the two, or a de-sulfurized layer.

Figure 2:
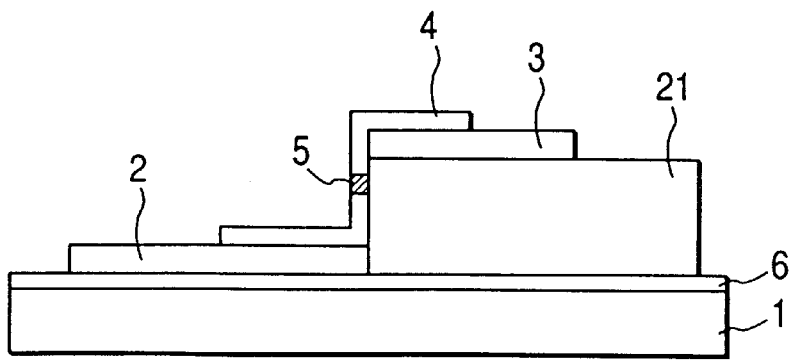
FIG. 2 is a schematic cross sectional view of another electron-emitting device that can be used for the purpose of the invention.

FIG. 2 is a schematic cross sectional view of another electron-emitting device that can be used for the purpose of the invention. Reference numeral 21 denotes a step-forming section. Note that the electron-emitting region 5 is formed on a lateral side of the step-forming section. The step-forming section is made of a material containing Na and S respectively only to sufficiently low levels, such as $SiO_2$ film formed by means of sputtering.

While the oppositely arranged lower and higher potential side device electrodes 4 and 5 may be made of any highly conducting material, preferred candidate materials include metals such as Ni, Cr, Au, Mo, W, Pt, Ti, Al, Cu and Pd and their alloys, printable conducting materials made of a metal or a metal oxide selected from Pd, Ag, Au, $RuO_2$, Pd—Ag and glass, transparent conducting materials such as $In_2O_3$—$SnO_2$ and semiconductor materials such as polysilicon.

The distance L separating the device electrodes, the length W of the device electrodes, the width W of the electroconductive film 4, the contour of the electroconductive film 4 and other factors for designing a surface conduction electron-emitting device according to the invention may be determined depending on the application of the device. The distance L separating the device electrodes is preferably between hundreds of nanometers and hundreds of micrometers and, still preferably, between several micrometers and several tens of micrometers.

The length W of the device electrodes is preferably between several micrometers and several hundreds of micrometers depending on the resistance of the electrodes and the electron-emitting characteristics of the device. The film thickness d of the device electrodes 2 and 3 is between several tens of nanometers and several micrometers. A surface conduction electron-emitting device according to the invention may have a configuration other than the one illustrated in FIGS. 1A, 1B and 2 and, alternatively, it may be prepared by sequentially laying an electroconductive film 4, and oppositely disposed device electrodes 2 and 3 on the processed surface layer 6 (or on the step-forming section formed therein) of the substrate 1.

The electroconductive film 4 is preferably made of a fine particle film containing fine particles in order to provide excellent electron-emitting characteristics. The thickness of the electroconductive film 4 is determined as a function of the stepped coverage of the electroconductive film on the device electrodes 2 and 3, the electric resistance between the device electrodes 2 and 3 and the parameters for the forming operation that will be described later as well as other factors and preferably between several hundreds of picometers and several hundreds of nanometers and more preferably between a nanometer and fifty nanometers. The electroconductive film 4 normally shows a sheet resistance Rs between $10^2$ and $10^7$ Ω/□. Note that Rs is the resistance defined by $R=Rs(l/w)$, where w and l are the width and the length of a thin film respectively and R is the resistance determined along the longitudinal direction of the thin film. Rs will be defined by equation $Rs=q/t$, where q and t are the electric resistivity and the thickness of the electroconductive film respectively. Note that, while the energization forming operation is described in terms of current conduction treatment here, the energization forming operation is not limited thereto and any operation that can produce a fissure in the electroconductive film to give rise to a region showing a high electric resistance may suitably be used for the purpose of the invention.

For the purpose of the invention, the electroconductive film 4 is made of fine particles of a material selected from metals such as Pd, Pt, Ru, Ag, Au, Ti, In, Cu, Cr, Fe, Zn, Sn, Ta, W and Pb and oxides such as PdO, $SnO_2$, $In_2O_3$, PbO and $Sb_2O_3$.

The electron-emitting region 5 is part of the electroconductive film 4 and comprises a fissure or fissures that are electrically highly resistive, although its performance is dependent on the thickness and the material of the electroconductive film 4 and the energization forming process which will be described hereinafter. The electron emitting region 5 may contain in the inside electroconductive fine particles having a diameter between several hundreds of picometers and several tens of nanometers. Thus, the electroconductive fine particles of the electroconductive film may contain all or part of the substances of the electroconductive film 4. The electron emitting region 5 and part of the thin film 4 surrounding the electron emitting region 5 may contain carbon and/or carbon compounds.

While various methods may be conceivable for manufacturing an electron-emitting device, FIGS. 3A through 3D schematically illustrate a typical one of such methods.

Now, a method of manufacturing an electron-emitting device will be described by referring to FIGS. 1A, 1B and 3A through 3D. Note that the same or similar components are denoted respectively by the same reference symbols throughout these figures.

Figure 3A:
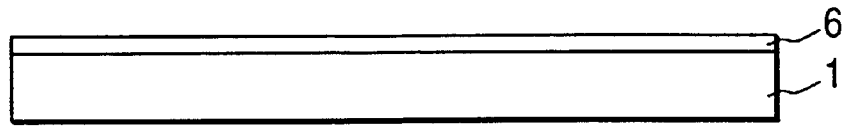
FIGS. 3A, 3B 3C and 3D are schematic cross sectional views of an electron-emitting device that can be used for the purpose of the invention, showing different manufacturing steps.
Figure 3B:
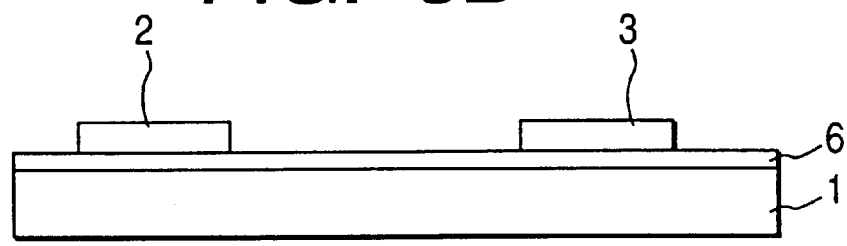

1) After forming a processed surface layer 6 of a substrate 1 (FIG. 3A) and thoroughly cleansing the substrate 1 with detergent and pure water or organic solvent, a material is deposited on the substrate 1 by means of vacuum evaporation, sputtering or some other appropriate technique for a pair of device electrodes 2 and 3, which are then produced by photolithography. Alternatively, the device electrodes 2 and 3 may be produced by arranging a printable material on the substrate 1 to show a predetermined contour by offset printing or screen printing and thereafter heating the material (FIG. 3B).

Figure 3C:
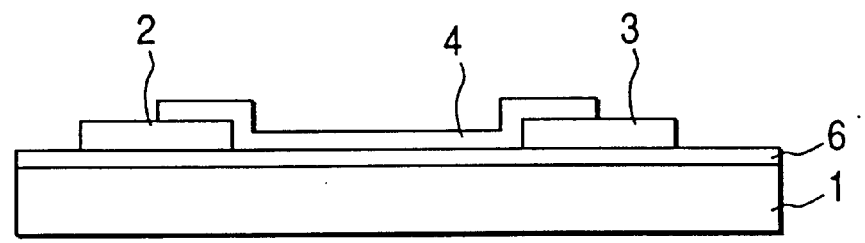

2) An organic metal thin film is formed on the processed surface layer 6 carrying thereon the pair of device electrodes 2 and 3 by applying an organic metal solution and leaving the applied solution for a given period of time. The organic metal solution may contain as a principal ingredient any of the metals listed above for the electroconductive film 4. Thereafter, the organic metal thin film is heated, baked and subsequently subjected to a patterning operation, using an appropriate technique such as lift-off or etching, to produce an electroconductive film 4 (FIG. 3C). While an organic metal solution is applied to produce a thin film in the above description, an electroconductive film 4 may alternatively be formed by vacuum evaporation, sputtering, chemical vapor phase deposition, dispersion application, dipping, spinner coating or some other technique.

Figure 3D:
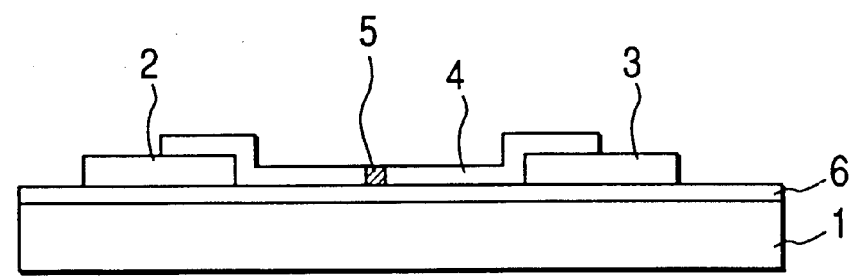

3) Thereafter, the device electrodes 2 and 3 are subjected to a process referred to as "forming". Here, an energization forming process will be described as a choice for the forming process. More specifically, the device electrodes 2 and 3 are electrically energized by means of a power source (not shown) until an electron emitting region 5 is produced in a given area of the electroconductive film 4 to show a modified structure that is different from the structure of the electroconductive film 4 (FIG. 3D). In other words, the electroconductive film 4 is locally and structurally destroyed, deformed or transformed to produce an electron emitting region 5 as a result of an energization forming process.

Figure 4A:
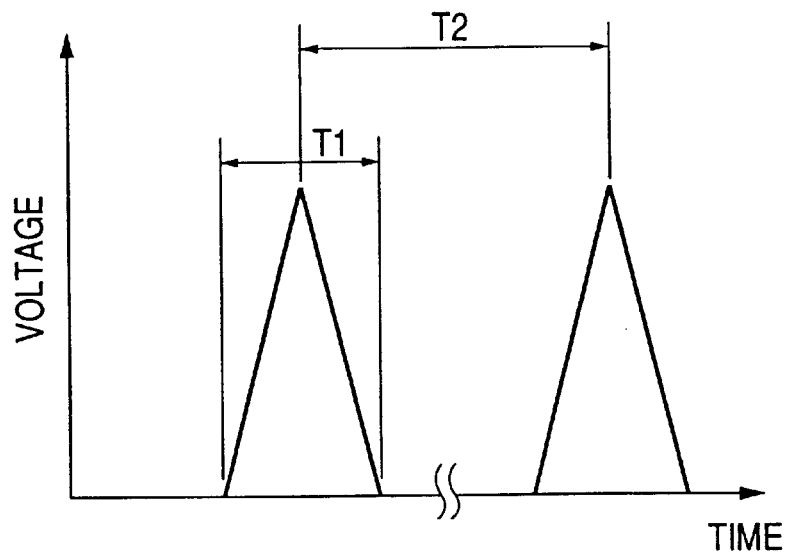
FIGS. 4A and 4B are graphs showing two alternative waveforms of a pulse voltage that can be used for manufacturing an electron-emitting device for the purpose of the invention.
Figure 4B:
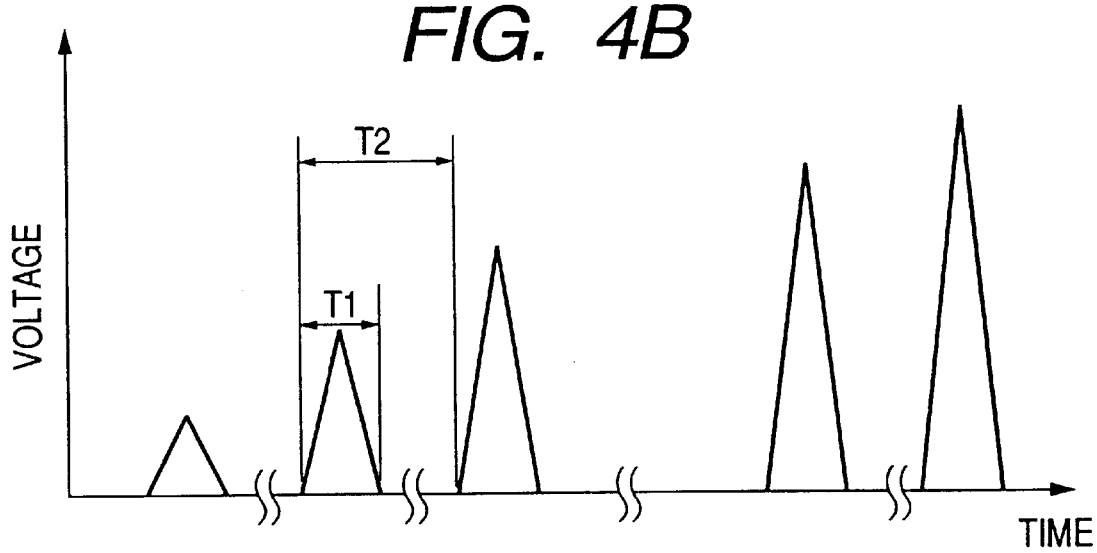

FIGS. 4A and 4B show two different voltage waveforms that can be used for energization forming. The voltage waveform is preferably a pulse waveform for the purpose of the invention. A pulse voltage having a constant height or a constant peak voltage may be applied continuously as shown in FIG. 4A or, alternatively, a pulse voltage having an increasing height or an increasing peak voltage may be applied as shown in FIG. 4B.

In FIG. 4A, the pulse voltage has a pulse width T1 and a pulse interval T2, which are typically between 1 μsec. and 10 msec. and between 10 μsec. and 100 msec. respectively. The height of the triangular wave (the peak voltage for the energization forming operation) may be appropriately selected depending on the profile of the surface conduction electron-emitting device. The voltage is typically applied for several to several tens of minutes. Note, however, that the pulse waveform is not limited to triangular and a rectangular or some other waveform may alternatively be used.

FIG. 4B shows a pulse voltage whose pulse height increases with time. In FIG. 4B, the pulse voltage has an width T1 and a pulse interval T2 that are substantially similar to those of FIG. 4A. The height of the triangular wave (the peak voltage for the energization forming operation) is increased at a rate of, for instance, 0.1V per step.

The energization forming operation will be terminated by measuring the current running through the device electrodes when a voltage that is sufficiently low and cannot locally destroy or deform the electroconductive film 2 is applied to the device during the interval T2 of the pulse voltage. Typically, the energization forming operation is terminated when a resistance greater than 1 MΩ is observed for the device current running through the electroconductive film 4 while applying a voltage of approximately 0.1V to the device electrodes.

4) After the energization forming operation, the device is subjected to an activation process. An activation process is a process by means of which the device current If and the emission current Ie are changed remarkably.

In an activation process, a pulse voltage may be repeatedly applied to the device in an atmosphere of the gas of an organic substance as in the case of the energization forming process. The atmosphere may be produced by utilizing the organic gas remaining in a vacuum chamber after evacuating the chamber by means of an oil diffusion pump or a rotary pump or by sufficiently evacuating a vacuum chamber by means of an ion pump and thereafter introducing the gas of an organic substance into the vacuum. The gas pressure of the organic substance is determined as a function of the profile of the electron-emitting device to be treated, the profile of the vacuum chamber, the type of the organic substance and other factors. Organic substances that can be suitably used for the purpose of the activation process include aliphatic hydrocarbons such as alkanes, alkenes and alkynes, aromatic hydrocarbons, alcohols, aldehydes, ketones, amines, organic acids such as phenol, carboxylic acids and sulfonic acids. Specific examples include saturated hydrocarbons expressed by general formula $C_nH_{2n+2}$ such as methane, ethane and propane, unsaturated hydrocarbons expressed by general formula $C_nH_{2n}$ such as ethylene and propylene, benzene, toluene, methanol, ethanol, formaldehyde, acetaldehyde, acetone, methylethylketone, methylamine, ethylamine, phenol, formic acid, acetic acid and propionic acid. As a result of an activation process, carbon or a carbon compound is deposited on the device out of the organic substances existing in the atmosphere to remarkably change the device current If and the emission current Ie.

The activation process will be terminated appropriately by observing the device current If and the emission current Ie. The pulse width, the pulse interval and the pulse wave height of the pulse voltage to be used in the activation process may be selected appropriately.

For the purpose of the present invention, carbon and a carbon compound refer to graphite (including HOPG, PG and GC, where HOPG refers to a crystalline graphite structure and PG refers to a somewhat disordered crystal structure with a crystal grain size of about 20 nm, whereas GC refers to a considerably disordered crystal structure) and noncrystalline carbon (amorphous carbon, a mixture of amorphous carbon and fine graphite crystal) and the thickness of the deposit of such carbon or a carbon compound is preferably less than 50 nm and more preferably less than 30 nm.

5) An electron-emitting device that has been treated in an energization forming process and an activation process is then preferably subjected to a stabilization process. This is a process for removing any organic substances remaining in the vacuum chamber. The vacuuming and exhausting equipment to be used for this process preferably does not involve the use of oil so that it may not produce any evaporated oil that can adversely affect the performance of the treated device during the process. Thus, the use of a sorption pump or an ion pump may be a preferable choice.

If an oil diffusion pump or a rotary pump is used for the activation process and the organic gas produced by the oil is also utilized, the partial pressure of the organic gas has to be minimized by any means. The partial pressure of the organic gas in the vacuum chamber is preferably lower than $1.3 \times 10^{-6}$ Pa and more preferably lower than $1.3 \times 10^{-8}$ Pa if no carbon or carbon compound is additionally deposited. The vacuum chamber is preferably evacuated after heating the entire chamber so that organic molecules adsorbed by the inner walls of the vacuum chamber and the electron-emitting device(s) in the chamber may also be easily eliminated. While the vacuum chamber is preferably heated to 80 to 250° C. for more than 5 hours in most cases, other heating conditions may alternatively be selected depending on the size and the profile of the vacuum chamber and the configuration of the electron-emitting device(s) in the chamber as well as other considerations. The pressure in the vacuum chamber needs to be made as low as possible and it is preferably lower than $1 \times 10^{-5}$ Pa and more preferably lower than $1.3 \times 10^{-6}$ Pa.

After the stabilization process, the atmosphere for driving the electron-emitting device or the electron source is preferably the same as the one when the stabilization process is completed, although a lower pressure may alternatively be used without damaging the stability of operation of the electron-emitting device or the electron source if the organic substances in the chamber are sufficiently removed.

By using such an atmosphere, the formation of any additional deposit of carbon or a carbon compound can be effectively suppressed to consequently stabilize the device current If and the emission current Ie.

The performance of a electron-emitting device prepared by way of the above processes, to which the present invention is applicable, will be described by referring to FIGS. 5 and 6.

Figure 5:
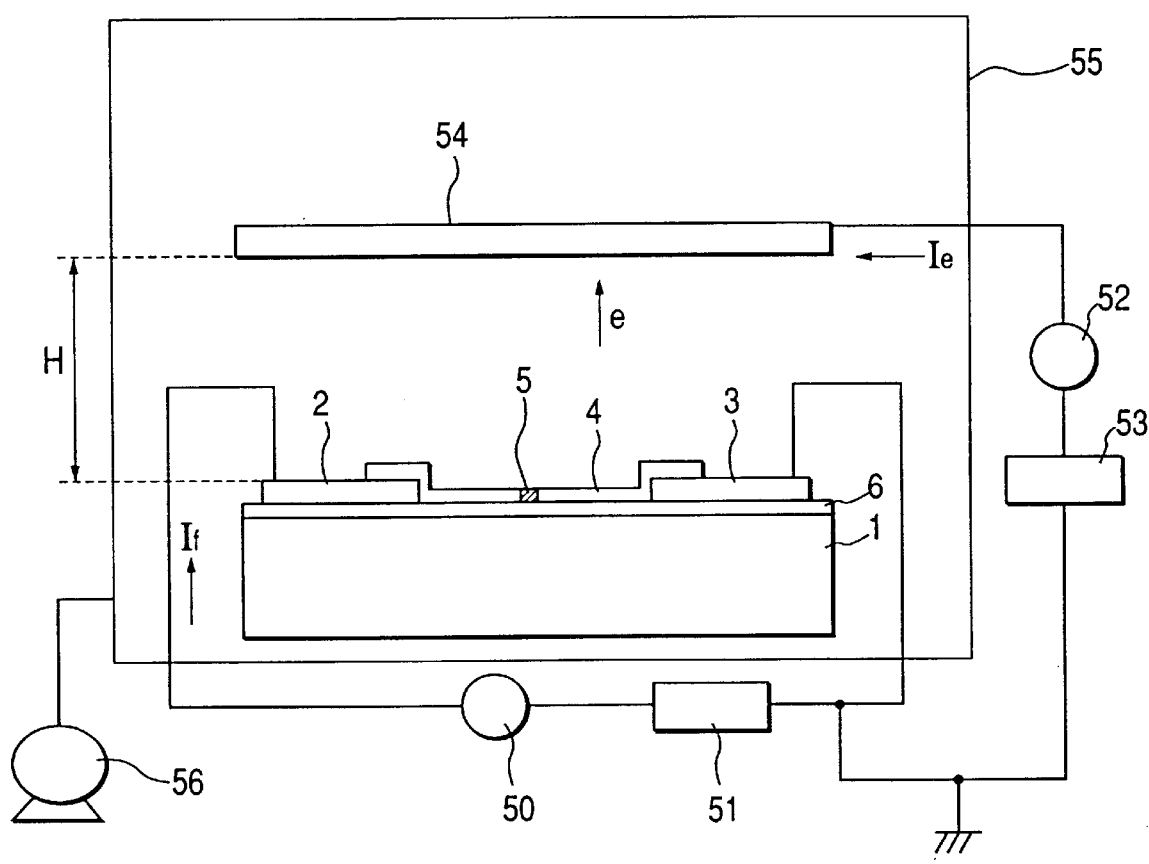
FIG. 5 is a schematic illustration of a vacuum processing system (gauging system) that can be used for the purpose of the invention.

FIG. 5 is a schematic block diagram of a vacuum processing system comprising a vacuum chamber that can be used for the above processes. It can also be used as a gauging system for determining the performance of an electron emitting device of the type under consideration. Referring to FIG. 5, the gauging system includes a vacuum chamber 55 and an evacuation device 56. An electron-emitting device is placed in the vacuum chamber 55. The device comprises a substrate 1, a pair of device electrodes 2 and 3, a thin film 4 and an electron-emitting region 5. Otherwise, the gauging system has a power source 51 for applying a device voltage Vf to the device, an ammeter 50 for metering the device current If running through the thin film 4 between the device electrodes 2 and 3, an anode 54 for capturing the emission current Ie produced by electrons emitted from the electron-emitting region of the device, a high voltage source 53 for applying a voltage to the anode 54 of the gauging system and another ammeter 52 for metering the emission current Ie produced by electrons emitted from the electron-emitting region 5 of the device. For determining the performance of the electron-emitting device, a voltage between 1 and 10KV may be applied to the anode, which is spaced apart from the electron emitting device by distance H which is between 2 and 8 mm.

Instruments including a vacuum gauge and other pieces of equipment necessary for the gauging system are arranged in the vacuum chamber 55 so that the performance of the electron-emitting device or the electron source in the chamber may be properly tested. The evacuation pump 56 may be provided with an ordinary high vacuum system comprising a turbo pump or a rotary pump and an ultra-high vacuum system comprising an ion pump. The vacuum chamber containing an electron source therein can be heated by means of a heater (not shown). Therefore, the vacuum processing system can be used for the energization forming step and the subsequent steps.

Figure 6:
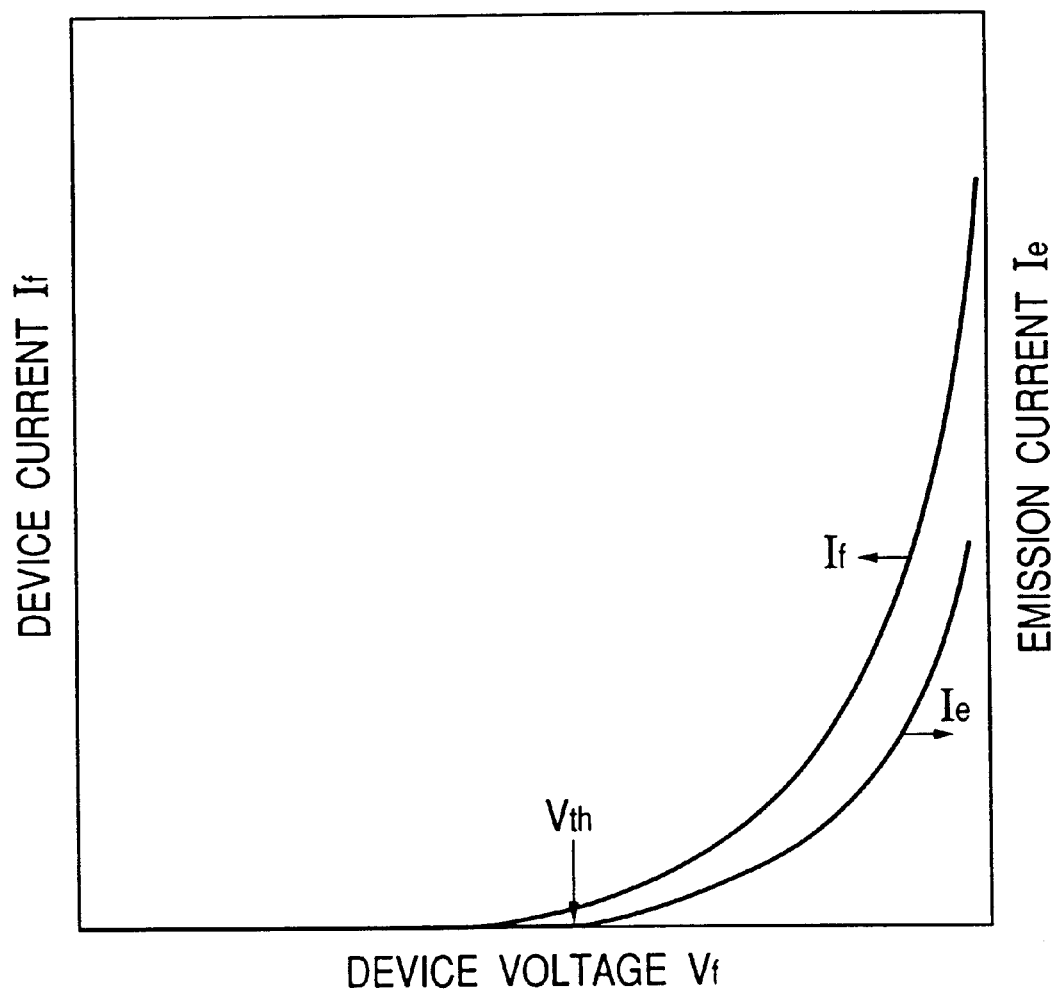
FIG. 6 is a graph showing the relationship among the device voltage Vf, the device current If and the emission current Ie of an electron-emitting device that can be used for the purpose of the invention.

FIG. 6 shows a graph schematically illustrating the relationship between the device voltage Vf and the emission current Ie and the device current If typically observed by the gauging system of FIG. 5. Note that different units are arbitrarily selected for Ie and If in FIG. 6 in view of the fact that Ie has a magnitude by far smaller than that of If. Note that both the vertical and transversal axes of the graph represent a linear scale. As seen in FIG. 6, an electron-emitting device according to the invention has three remarkable features in terms of emission current Ie, which will be described below.

(i) Firstly, an electron-emitting device according to the invention shows a sudden and sharp increase in the emission current Ie when the voltage applied thereto exceeds a certain level (which is referred to as a threshold voltage hereinafter and indicated by Vth in FIG. 7), whereas the emission current Ie is practically undetectable when the applied voltage is found lower than the threshold value Vth. Differently stated, an electron-emitting device according to the invention is a non-linear device having a clear threshold voltage Vth to the emission current Ie.

(ii) Secondly, since the emission current Ie is highly dependent on the device voltage Vf, the former can be effectively controlled by way of the latter.

(iii) Thirdly, the emitted electric charge captured by the anode 54 is a function of the duration of time of application of the device voltage Vf. In other words, the amount of electric charge captured by the anode 54 can be effectively controlled by way of the time during which the device voltage Vf is applied.

Because of the above remarkable features, it will be understood that the electron-emitting behavior of an electron source comprising a plurality of electron-emitting devices according to the invention and hence that of an image-forming apparatus incorporating such an electron source can easily be controlled in response to the input signal. Thus, such an electron source and an image-forming apparatus may find a variety of applications.

On the other hand, the device current If either monotonically increases relative to the device voltage Vf as shown by a solid line in FIG. 6 (a characteristic referred to as "MI characteristic" hereinafter) or changes to show a curve (not shown) specific to a voltage-controlled-negative-resistance characteristic (a characteristic referred to as "VCNR characteristic" hereinafter). These characteristics of the device current can be controlled by appropriately controlling the above steps.

Now, some examples of the usage of electron-emitting devices, to which the present invention is applicable, will be described. An electron source and hence an image-forming apparatus can be realized by arranging a plurality of electron-emitting devices according to the invention on a substrate.

Electron-emitting devices may be arranged on a substrate in a number of different modes.

For instance, a number of electron-emitting devices may be arranged in parallel rows along a direction (hereinafter referred to as row-direction), each device being connected by wires at opposite ends thereof, and driven to operate by control electrodes (hereinafter referred to as grids) arranged in a space above the electron-emitting devices along a direction perpendicular to the row direction (hereinafter referred to as column-direction) to realize a ladder-like arrangement. Alternatively, a plurality of electron-emitting devices may be arranged in rows along an X-direction and columns along an Y-direction to form a matrix, the X- and Y-directions being perpendicular to each other, and the electron-emitting devices on a same row are connected to a common X-directional wire by way of one of the electrodes of each device while the electron-emitting devices on a same column are connected to a common Y-directional wire by way of the other electrode of each device. The latter arrangement is referred to as a simple matrix arrangement. Now, the simple matrix arrangement will be described in detail.

In view of the above described three basic characteristic features (i) through (iii) of a surface conduction electron-emitting device, to which the invention is applicable, it can be controlled for electron emission by controlling the wave height and the wave width of the pulse voltage applied to the opposite electrodes of the device above the threshold voltage level. On the other hand, the device does not practically emit any electron below the threshold voltage level. Therefore, regardless of the number of electron-emitting devices arranged in an apparatus, desired surface conduction electron-emitting devices can be selected and controlled for electron emission in response to an input signal by applying a pulse voltage to each of the selected devices.

Figure 7:
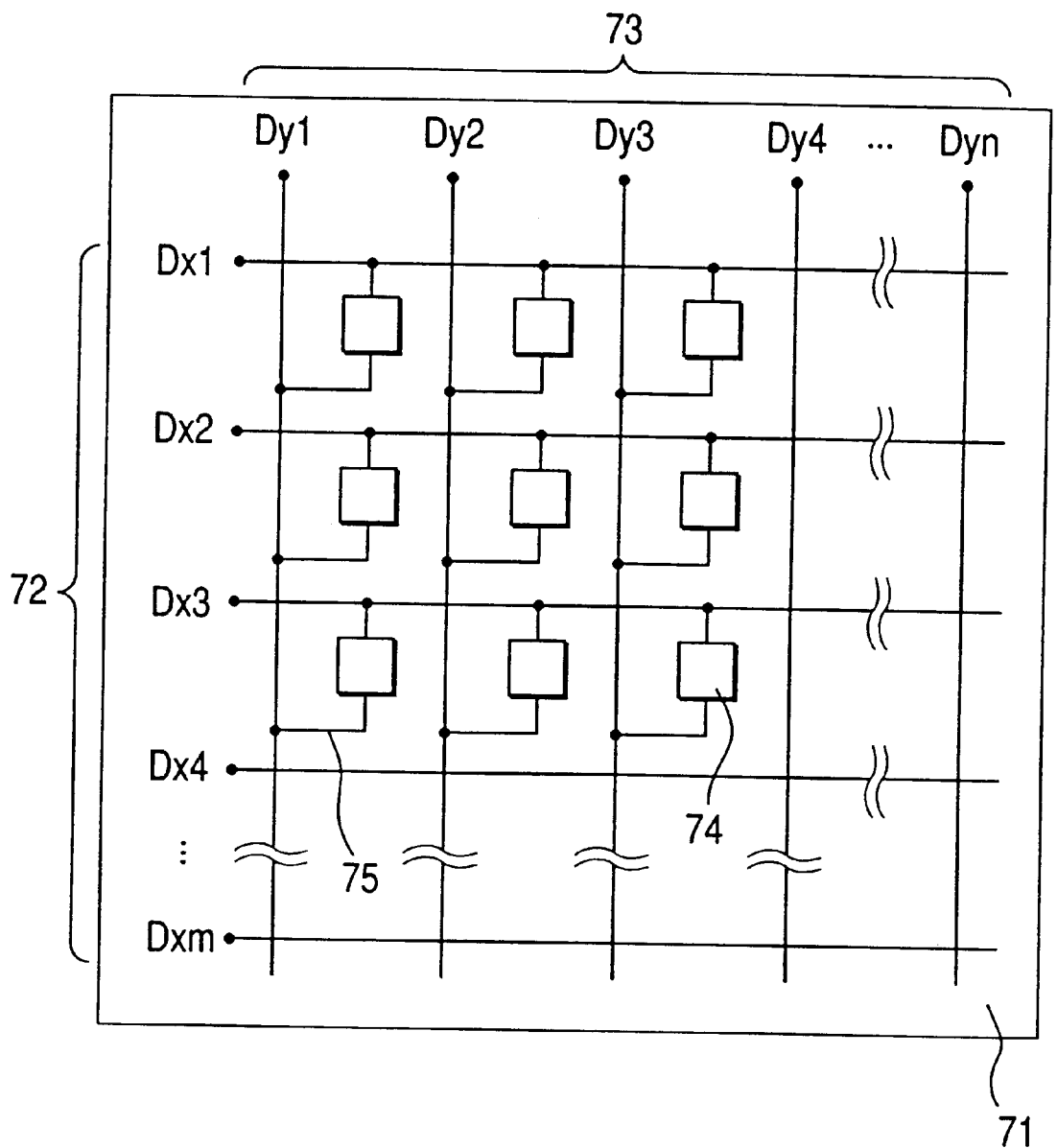
FIG. 7 is a schematic plan view of an electron source according to the invention.
Figure 8:
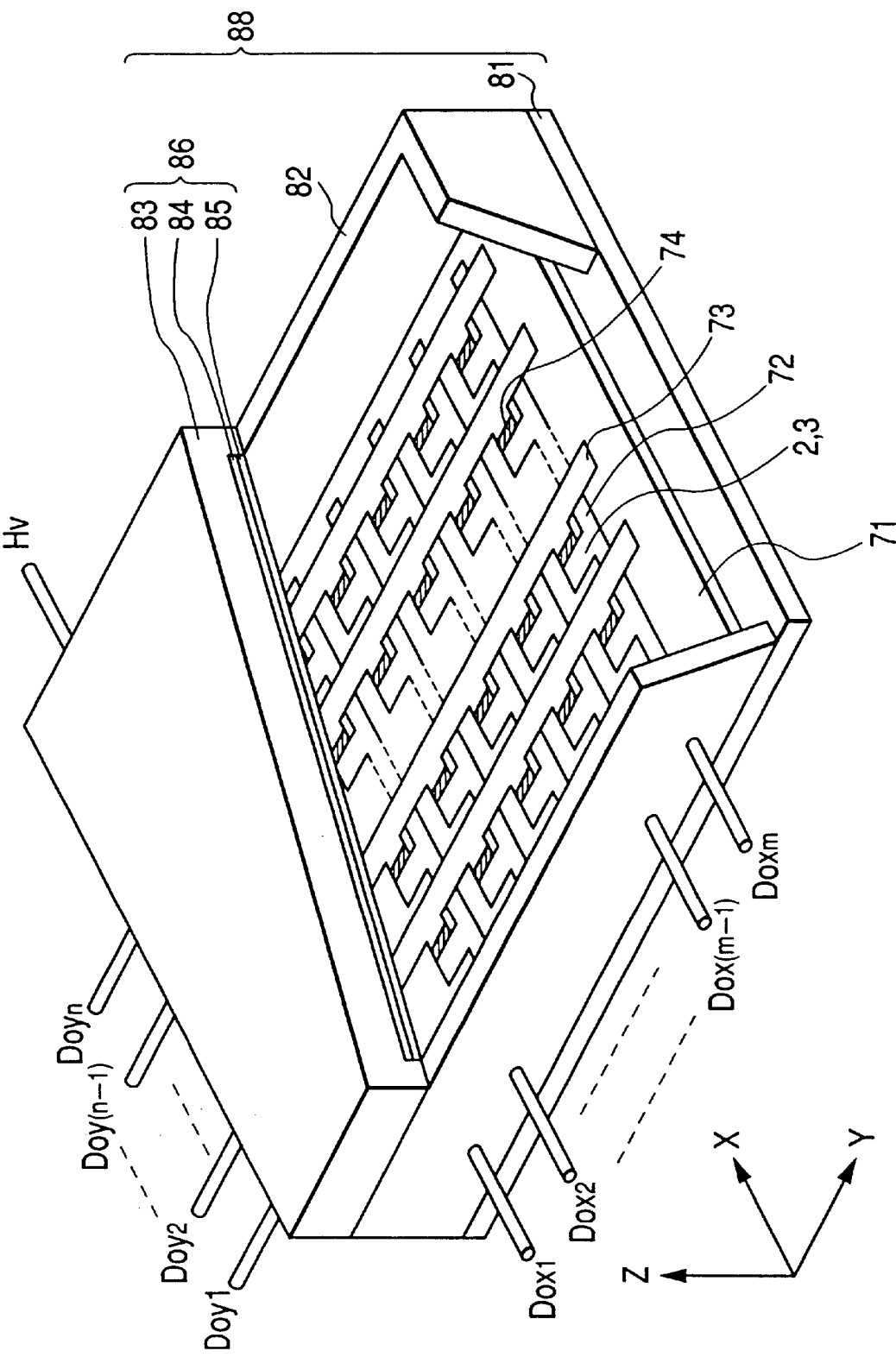
FIG. 8 is a schematic perspective view of an image-forming apparatus according to the invention.

FIG. 7 is a schematic plan view of an electron source realized by arranging a plurality of electron-emitting devices, to which the present invention is applicable, in order to exploit the above characteristic features. In FIG. 8, the electron source comprises a substrate 71, X-directional wires 72, Y-directional wires 73, surface conduction electron-emitting devices 74 and connecting wires 75. The surface conduction electron-emitting devices may be either of the flat type or of the step type described earlier.

There are provided a total of m X-directional wires 72, which are denoted by Dx1, Dx2, . . . , Dxm and made of an electroconductive metal produced by vacuum deposition, printing or sputtering. These wires are appropriately designed in terms of material, thickness and width. A total of n Y-directional wires are arranged and denoted by Dy1, Dy2, . . . , Dyn, which are similar to the X-directional wires in terms of material, thickness and width. An interlayer insulation layer (not shown) is disposed between the m X-directional wires and the n Y-directional wires to electrically isolate them from each other. (Both m and n are integers.)

The interlayer insulation layer (not shown) is typically made of $SiO_2$ and formed on the entire surface or part of the surface of the insulating substrate 71 to show a desired contour by means of vacuum deposition, printing or sputtering. The thickness, material and manufacturing method of the interlayer insulation layer are so selected as to make it withstand the potential difference between any of the X-directional wires 72 and any of the Y-directional wires 73 observable at the crossing thereof. Each of the X-directional wires 72 and the Y-directional wires 73 is drawn out to form an external terminal.

The oppositely arranged electrodes (not shown) of each of the surface conduction electron-emitting devices 74 are connected to related one of the m X-directional wires 72 and related one of the n Y-directional wires 73 by respective connecting wires 75 which are made of an electroconductive metal.

The electroconductive metal material of the device electrodes and that of the connecting wires 75 extending from the m X-directional wires 72 and the n Y-directional wires 73 may be the same or contain a common element as an ingredient. Alternatively, they may be different from each other. These materials may be appropriately selected typically from the candidate materials listed above for the device electrodes. If the device electrodes and the connecting wires are made of the same material, they may be collectively called device electrodes without discriminating the connecting wires.

The X-directional wires 72 are electrically connected to a scan signal application means (not shown) for applying a scan signal to a selected row of surface conduction electron-emitting devices 74. On the other hand, the Y-directional wires 73 are electrically connected to a modulation signal generation means (not shown) for applying a modulation signal to a selected column of surface conduction electron-emitting devices 74 and modulating the selected column according to an input signal. Note that the drive signal to be applied to each surface conduction electron-emitting device is expressed as the voltage difference of the scan signal and the modulation signal applied to the device.

With the above arrangement, each of the devices can be selected and driven to operate independently by means of a simple matrix wire arrangement.

Figure 9A:
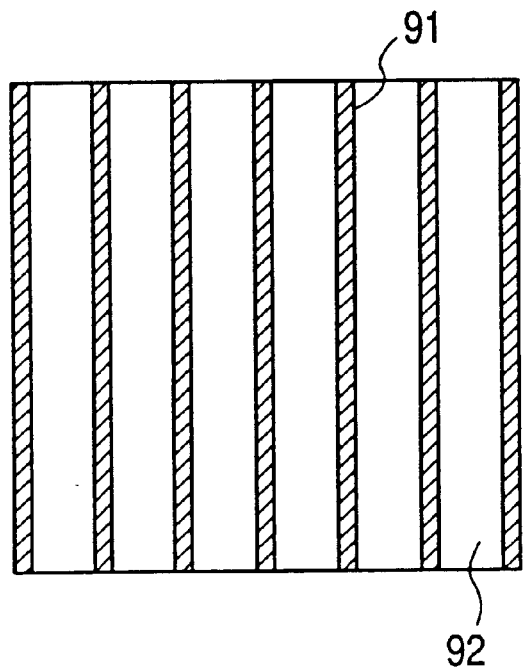
FIGS. 9A and 9B are schematic plan views of two alternative fluorescent films that can be used for an image-forming apparatus according to the invention.
Figure 9B:
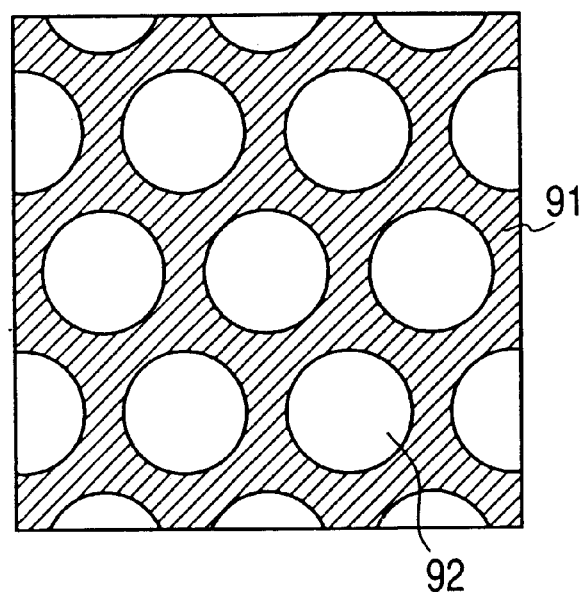
Figure 10:
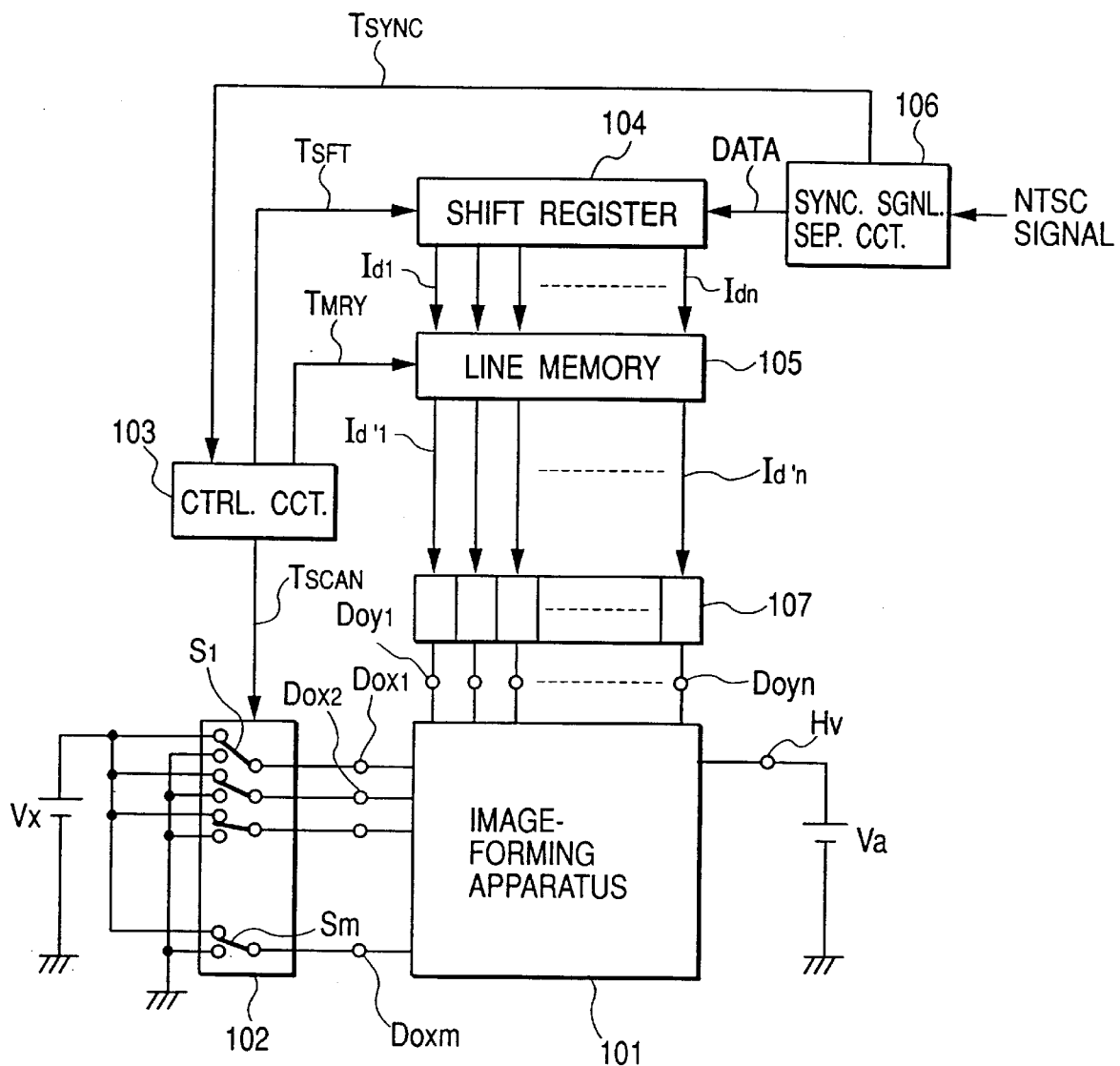
FIG. 10 is a schematic circuit diagram of a drive circuit that can be used for the purpose of the invention.

Now, an image-forming apparatus comprising an electron source having a simple matrix arrangement as described above will be described by referring to FIGS. 8, 9A, 9B and 10. FIG. 8 is a partially cut away schematic perspective view of the image forming apparatus and FIGS. 9A and 9B are schematic views, illustrating two possible configurations of a fluorescent film that can be used for the image forming apparatus of FIG. 8, whereas FIG. 10 is a block diagram of a drive circuit for the image forming apparatus that operates for NTSC television signals.

Referring firstly to FIG. 8 illustrating the basic configuration of the display panel of the image-forming apparatus, it comprises an electron source substrate 71 of the above described type carrying thereon a plurality of electron-emitting devices, a rear plate 81 rigidly holding the electron source substrate 71, a face plate 86 prepared by laying a fluorescent film 84 and a metal back 85 on the inner surface of a glass substrate 83 and a support frame 82, to which the rear plate 81 and the face plate 86 are bonded by means of frit glass.

In FIG. 8, reference numeral 74 denotes the electron-emitting region of each electron-emitting device as shown in FIG. 1 and reference numerals 72 and 73 respectively denote the X-directional wire and the Y-directional wire connected to the respective device electrodes of each electron-emitting device.

While the envelope 88 of the above described image-forming apparatus is formed of the face plate 86, the support frame 82 and the rear plate 81 in the above described embodiment, the rear plate 81 may be omitted if the substrate 71 is strong enough by itself because the rear plate 81 is provided mainly for reinforcing the substrate 71. If such is the case, an independent rear plate 81 may not be required and the substrate 71 may be directly bonded to the support frame 82 so that the envelope 88 is constituted of a face plate 86, a support frame 82 and a substrate 71. The overall strength of the envelope 88 may be increased by arranging a number of support members called spacers (not shown) between the face plate 86 and the rear plate 81.

FIGS. 9A and 9B schematically illustrate two possible arrangements of fluorescent film. While the fluorescent film 84 comprises only a single fluorescent body if the display panel is used for showing black and white pictures, it needs to comprise for displaying color pictures black conductive members 91 and fluorescent bodies 92, of which the former are referred to as black stripes or members of a black matrix depending on the arrangement of the fluorescent bodies. Black stripes or members of a black matrix are arranged for a color display panel so that the fluorescent bodies 92 of the three different primary colors are made less discriminable and the adverse effect of reducing the contrast of displayed images of external light is weakened by blackening the surrounding areas. While graphite is normally used as a principal ingredient of the black stripes, other conductive material having low light transmissivity and reflectivity may alternatively be used.

A precipitation or printing technique is suitably used for applying a fluorescent material on the glass substrate 83 regardless of black and white or color display. An ordinary metal back 85 is arranged on the inner surface of the fluorescent film. The metal back 85 is provided in order to enhance the luminance of the display panel by causing the rays of light emitted from the fluorescent bodies and directed to the inside of the envelope to turn back toward the face plate 86, to use it as an electrode for applying an accelerating voltage to electron beams and to protect the fluorescent bodies against damages that may be caused when negative ions generated inside the envelope collide with them. It is prepared by smoothing the inner surface of the fluorescent film (in an operation normally called "filming") and forming an Al film thereon by vacuum deposition after forming the fluorescent film.

A transparent electrode (not shown) may be formed on the face plate 86 facing the outer surface of the fluorescent film 84 in order to raise the conductivity of the fluorescent film 84.

Care should be taken to accurately align each set of color fluorescent bodies and an electron-emitting device, if a color display is involved, before the above listed components of the envelope are bonded together.

An image-forming apparatus as illustrated in FIG. 8 can be prepared in a manner as described below.

Figure 13:
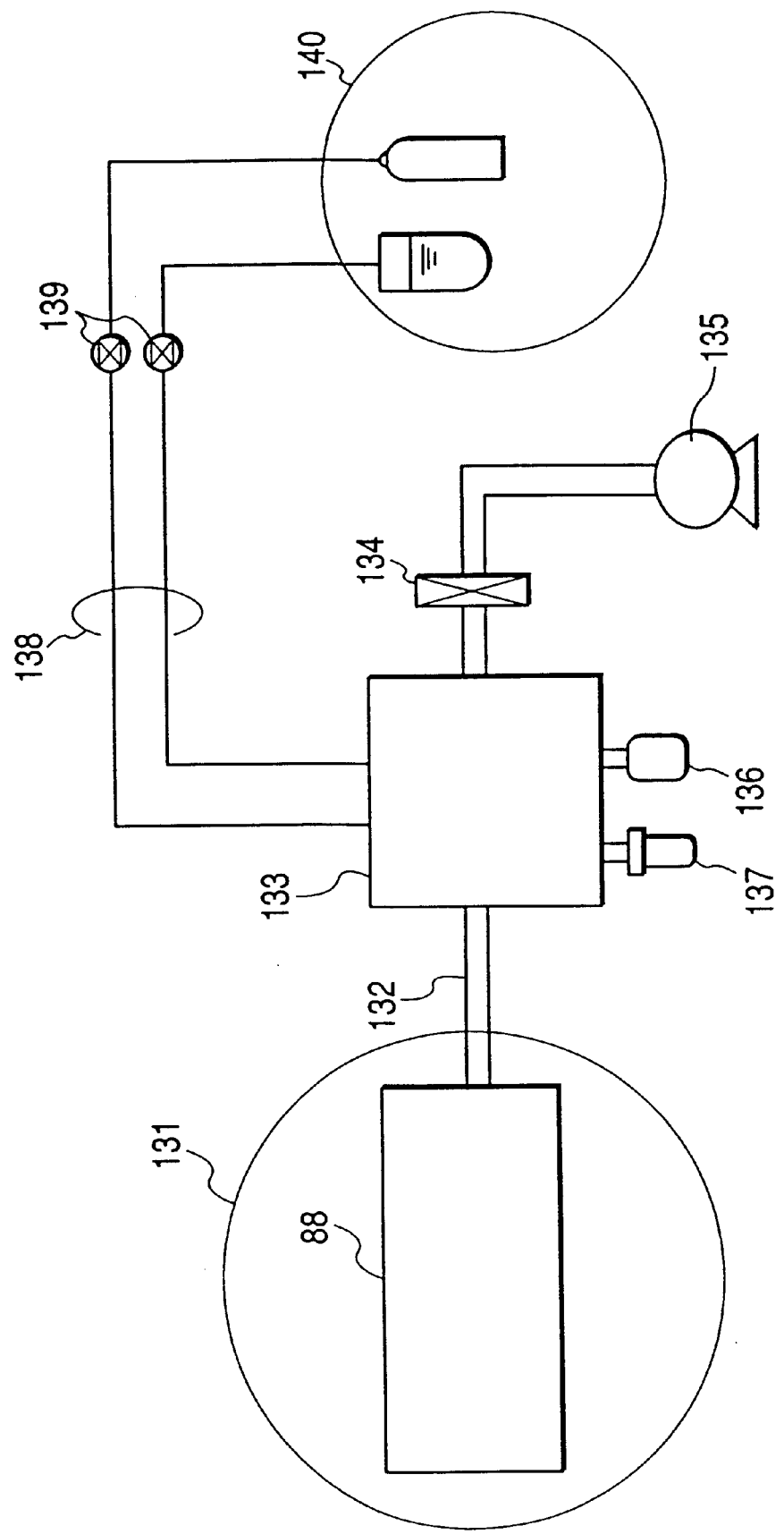
FIG. 13 is a schematic illustration of a system that can be used for manufacturing an image-forming apparatus according to the invention.
Figure 14:
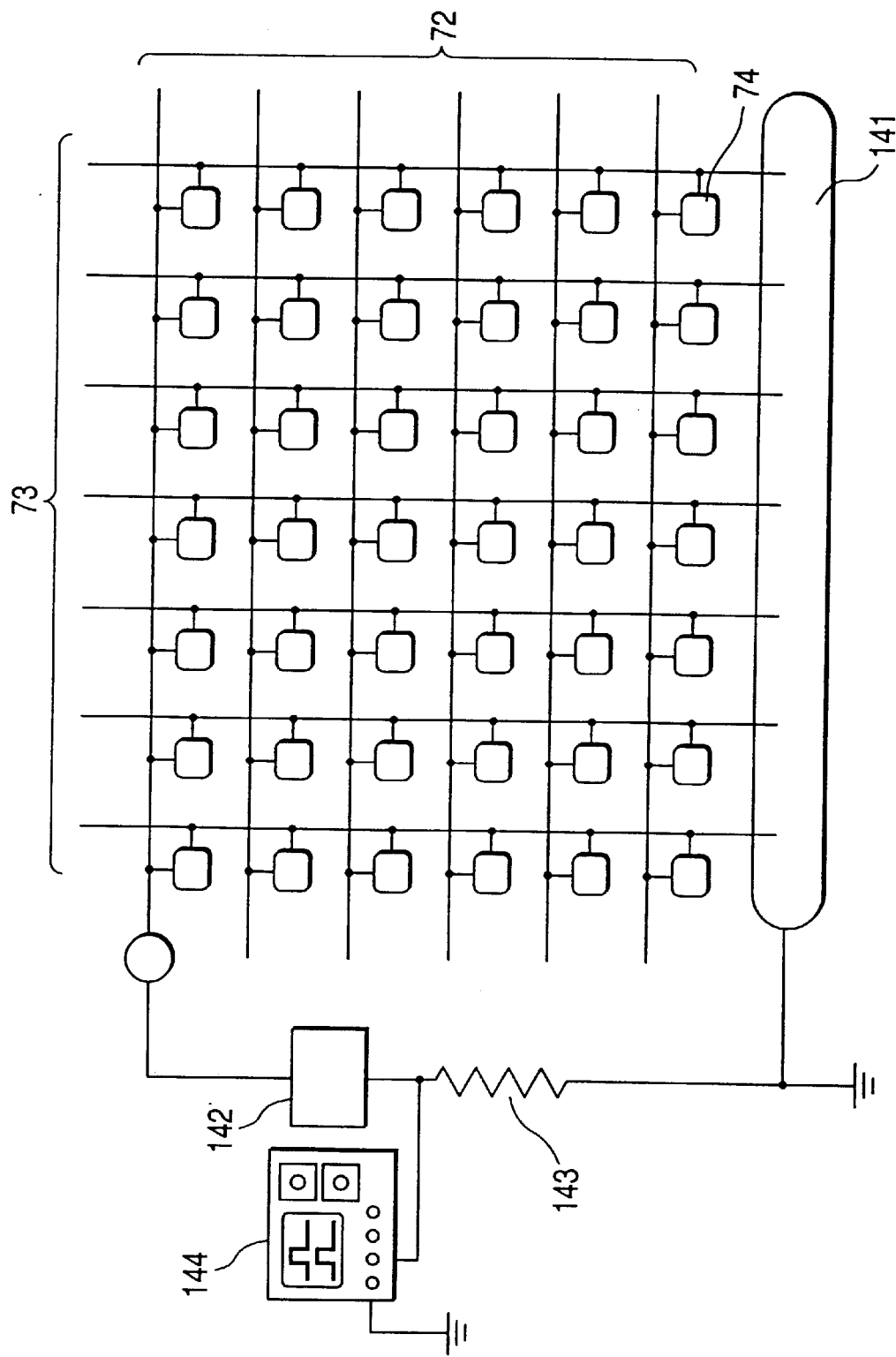
FIG. 14 is a schematic circuit diagram illustrating a wiring arrangement that can be used for the process of energization forming for the purpose of the invention.

FIG. 13 is a schematic diagram of a system to be used for preparing an image-forming apparatus. Referring to FIG. 13, the image-forming apparatus 131 is connected to a vacuum chamber 133 by way of an exhaust pipe 132 and then further to an exhaust system 135 by way of a gate valve 134. The vacuum chamber 133 is provided with a pressure gauge 136, a quadrupole mass spectrometer 137 and other elements for measuring the internal pressure and the partial pressures of the individual gaseous substances contained in the atmosphere. Since it is difficult to directly measure the internal pressure of the envelope 88 of the image-forming apparatus 131, the conditions for the system are controlled by observing the internal pressure of the vacuum chamber 133 and other measurable pressures.

The vacuum chamber 133 is further connected to a gas feed line 138 for feeding gas necessary for controlling the atmosphere in the vacuum chamber. The other end of the gas feed line 138 is connected to a substance source 140 storing substances to be supplied to the vacuum chamber in respective ampules and/or tanks. Feed control means 139 are arranged on the gas feed line for controlling the rates at which the respective substances are fed to the vacuum chamber. The feed control means 139 may include valves such as slow leak valves for controlling the flow rate of the substances to be discharged and mass flow controllers depending on the substances stored in the substance source.

The inside of the envelope 88 is evacuated by means of the system illustrated in FIG. 13 and the electron-emitting devices in the envelope are subjected to an energization forming process, where the Y-directional wires 73 are connected to a common electrode 141 and a pulse voltage is applied to the devices on each of the X-directional wires 72 by means of a power source 142 simultaneously. The pulse waveform and the conditions for determining the end of the process may be selected appropriately in a manner as described earlier on the forming process to be conducted on individual devices. Alternatively, the energization forming process can be conducted collectively on the devices connected to a plurality of X-directional wires by sequentially applying voltages having shifted phases to the respective X-directional wires (an operation referred to as scrolling).

An activation process follows the energization forming process. In the activation process, the envelope 88 is thoroughly evacuated and then organic substances are introduced into it by way of the gas feed line 138. Alternatively the envelope may be evacuated by means of an oil diffusion pump or a rotary pump and the residual organic substances remaining in the vacuum may be utilized for the activation process. If necessary, substances other than organic substances may also be introduced in this activation process. Then, a pulse voltage is applied to each of the electron-emitting devices in an atmosphere containing the organic substances until carbon and/or a carbon compound are deposited to drastically increase the rate of electron emission of the devices as described earlier by referring to the activation process of individual electron-emitting devices. The pulse voltage may be applied simultaneously to all the devices connected a single directional wire as in the case of the energization forming process.

After the completion of the activation process, the electron-emitting devices are preferably subjected to a stabilization process.

In the stabilization process, the envelope 88 is evacuated by way of the exhaust pipe 132, using an oil free exhaust system typically comprising an ion pump and a sorption pump, while heating and maintaining the envelope 88 to 80–250° C., to produce an atmosphere sufficiently free from organic substances in the inside. Then the envelope is hermetically sealed by heating and melting the exhaust pipe by means of a burner. A getter process may be conducted in order to maintain the achieved degree of vacuum in the inside of the envelope 88 after it is sealed. In a getter process, a getter arranged at a predetermined position (not shown) in the envelope 88 is heated by means of a resistance heater or a high frequency heater to form a film by evaporation immediately before or after the envelope 88 is sealed. A getter typically contains Ba as a principal ingredient and can maintain a low pressure atmosphere in the envelope 88 by removing moisture and oxygen discharged from the walls of the sealed envelope by the adsorption effect of the film formed by evaporation.

Now, a drive circuit for driving a display panel comprising an electron source with a simple matrix arrangement for displaying television images according to NTSC television signals will be described by referring to FIG. 10. In FIG. 10, reference numeral 101 denotes a display panel. Otherwise, the circuit comprises a scan circuit 102, a control circuit 103, a shift register 104, a line memory 105, a synchronizing signal separation circuit 106 and a modulation signal generator 107. Vx and Va in FIG. 10 denote DC voltage sources.

The display panel 101 is connected to external circuits via terminals Dox1 through Doxm, Doy1 through Doym and high voltage terminal Hv, of which terminals Dox1 through Doxm are designed to receive scan signals for sequentially driving on a one-by-one basis the rows (of N devices) of an electron source in the apparatus comprising a number of electron-emitting devices arranged in the form of a matrix having M rows and N columns. On the other hand, terminals Doy1 through Doyn are designed to receive a modulation signal for controlling the output electron beam of each of the electron-emitting devices of a row selected by a scan signal. High voltage terminal Hv is fed by the DC voltage source Va with a DC voltage of a level typically around 10 kv, which is sufficiently high to energize the fluorescent bodies of the selected electron-emitting devices.

The scan circuit 102 operates in a manner as follows. The circuit comprises M switching devices (of which only devices S1 and Sm are specifically indicated in FIG. 10), each of which takes either the output voltage of the DC voltage source Vx or 0[V] (the ground potential level) and comes to be connected with one of the terminals Dox1 through Doxm of the display panel 101. Each of the switching devices S1 through Sm operates in accordance with control signal Tscan fed from the control circuit 103 and can be prepared by combining transistors such as FETs.

The DC voltage source Vx of this circuit is designed to output a constant voltage such that any drive voltage applied to devices that are not being scanned due to the performance of the surface conduction electron-emitting devices (or the threshold voltage for electron emission) is reduced to less than threshold voltage.

The control circuit 103 coordinates the operations of related components so that images may be appropriately displayed in accordance with externally fed video signals. It generates control signals Tscan, Tsft and Tmry in response to synchronizing signal Tsync fed from the synchronizing signal separation circuit 106, which will be described below.

The synchronizing signal separation circuit 106 separates the synchronizing signal component and the luminance signal component from an externally fed NTSC television signal and can be easily realized using a popularly known frequency separation (filter) circuit. Although a synchronizing signal extracted from a television signal by the synchronizing signal separation circuit 106 is constituted, as well known, of a vertical synchronizing signal and a horizontal synchronizing signal, it is simply designated as Tsync signal here for convenience sake, disregarding its component signals. On the other hand, a luminance signal drawn from a television signal, which is fed to the shift register 104, is designed as DATA signal. The DATA signal is then entered to the shift register 104.

The shift register 104 carries out for each line a serial/parallel conversion on DATA signals that are serially fed on a time series basis in accordance with control signal Tsft fed from the control circuit 103. (In other words, a control signal Tsft operates as a shift clock for the shift register 104.) A set of data for a line that have undergone a serial/parallel conversion (and correspond to a set of drive data for N electron-emitting devices) are sent out of the shift register 104 as n parallel signals Id1 through Idn.

The line memory 105 is a memory for storing a set of data for a line, which are signals Id1 through Idn, for a required period of time according to control signal Tmry coming from the control circuit 103. The stored data are sent out as I'd1 through I'dn and fed to modulation signal generator 107.

Said modulation signal generator 107 is in fact a signal source that appropriately drives and modulates the operation of each of the electron-emitting devices and output signals of this device are fed to the electron-emitting devices in the display panel 101 via terminals Doy1 through Doyn.

As described above, an electron-emitting device, to which the present invention is applicable, is characterized by the following features in terms of emission current Ie. Firstly, there exists a clear threshold voltage Vth and the device emits electrons only when a voltage exceeding Vth is applied thereto. Secondly, the level of emission current Ie changes as a function of the change in the applied voltage above the threshold level Vth, although the value of Vth and the relationship between the applied voltage and the emission current may vary depending on the materials, the configuration and the manufacturing method of the electron-emitting device. More specifically, when a pulse-shaped voltage is applied to an electron-emitting device according to the invention, practically no emission current is generated so far as the applied voltage remains under the threshold level, whereas an electron beam is emitted once the applied voltage rises above the threshold level. It should be noted here that the intensity of an output electron beam can be controlled by changing the peak level Vm of the pulse-shaped voltage. Additionally, the total amount of electric charge of an electron beam can be controlled by varying the pulse width Pw.

Thus, either modulation method or pulse width modulation may be used for modulating an electron-emitting device in response to an input signal. With voltage modulation, a voltage modulation type circuit is used for the modulation signal generator 107 so that the peak level of the pulse shaped voltage is modulated according to input data, while the pulse width is held constant.

With pulse width modulation, on the other hand, a pulse width modulation type circuit is used for the modulation signal generator 107 so that the pulse width of the applied voltage may be modulated according to input data, while the peak level of the applied voltage is held constant.

Although it is not particularly mentioned above, the shift register 104 and the line memory 105 may be either of digital or of analog signal type so long as serial/parallel conversions and storage of video signals are conducted at a given rate.

If digital signal type devices are used, output signal DATA of the synchronizing signal separation circuit 106 needs to be digitized. However, such conversion can be easily carried out by arranging an A/D converter at the output of the synchronizing signal separation circuit 106. It may be needless to say that different circuits may be used for the modulation signal generator 107 depending on if output signals of the line memory 105 are digital signals or analog signals. If digital signals are used, a D/A converter circuit of a known type may be used for the modulation signal generator 107 and an amplifier circuit may additionally be used, if necessary. As for pulse width modulation, the modulation signal generator 107 can be realized by using a circuit that combines a high speed oscillator, a counter for counting the number of waves generated by said oscillator and a comparator for comparing the output of the counter and that of the memory. If necessary, an amplifier may be added to amplify the voltage of the output signal of the comparator having a modulated pulse width to the level of the drive voltage of a electron-emitting device according to the invention.

If, on the other hand, analog signals are used with voltage modulation, an amplifier circuit comprising a known operational amplifier may suitably be used for the modulation signal generator 107 and a level shift circuit may be added thereto if necessary. As for pulse width modulation, a known voltage control type oscillation circuit (VCO) may be used with, if necessary, an additional amplifier to be used for voltage amplification up to the drive voltage of the electron-emitting device.

With an image forming apparatus having a configuration as described above, to which the present invention is applicable, the electron-emitting devices emit electrons as a voltage is applied thereto by way of the external terminals Dox1 through Doxm and Doy1 through Doyn. Then, the generated electron beams are accelerated by applying a high voltage to the metal back 85 or a transparent electrode (not shown) by way of the high voltage terminal Hv. The accelerated electrons eventually collide with the fluorescent film 84, which by turn glows to produce images.

The above described configuration of image forming apparatus is only an example to which the present invention is applicable and may be subjected to various modifications. The TV signal system to be used with such an apparatus is not limited to a particular one and any system such as NTSC, PAL or SECAM may feasibly be used with it. It is particularly suited for TV signals involving a larger number of scanning lines (typically of a high definition TV system such as the MUSE system) because it can be used for a large display panel comprising a large number of pixels.

Now, an electron source comprising a plurality of surface conduction electron-emitting devices arranged in a ladder-like manner on a substrate and an image-forming apparatus comprising such an electron source will be described by referring to FIGS. 11 and 12.

Figure 11:
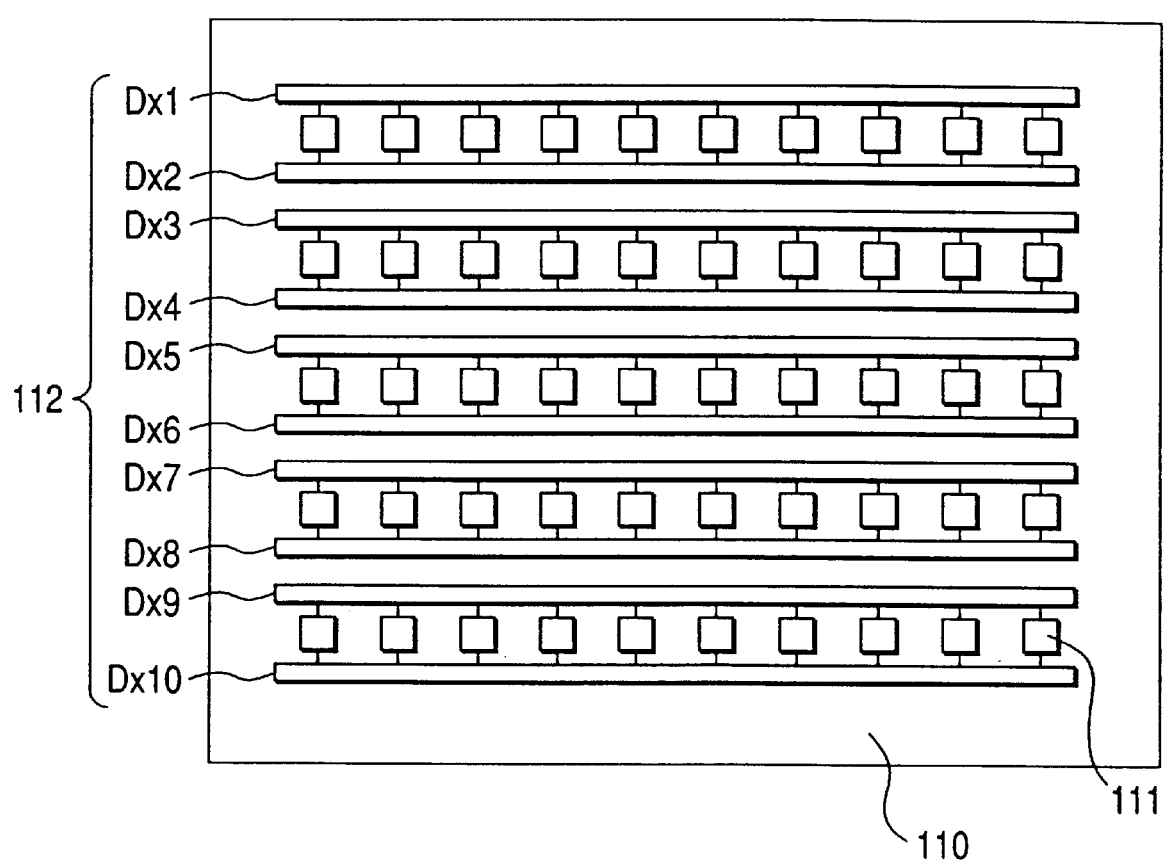
FIG. 11 is a schematic plan view of an electron source according to the invention and having an alternative configuration.

Firstly referring to FIG. 11, reference numeral 110 denotes an electron source substrate and reference numeral 111 denotes an surface conduction electron-emitting device arranged on the substrate, whereas reference numeral 112 denotes common wirings Dx1 through Dx10 for connecting the surface conduction electron-emitting devices. The electron-emitting devices 111 are arranged in rows (to be referred to as device rows hereinafter) to form an electron source comprising a plurality of device rows, each row having a plurality of devices. The surface conduction electron-emitting devices of each device row are electrically connected in parallel with each other by a pair of common wirings so that they can be driven independently by applying an appropriate drive voltage to the pair of common wirings. More specifically, a voltage exceeding the electron emission threshold level is applied to the device rows to be driven to emit electrons, whereas a voltage below the electron emission threshold level is applied to the remaining device rows. Alternatively, any two external terminals arranged between two adjacent device rows can share a single common wiring. Thus, of the common wirings Dx2 through Dx9, Dx2 and Dx3 can share a single common wiring instead of two wirings.

Figure 12:
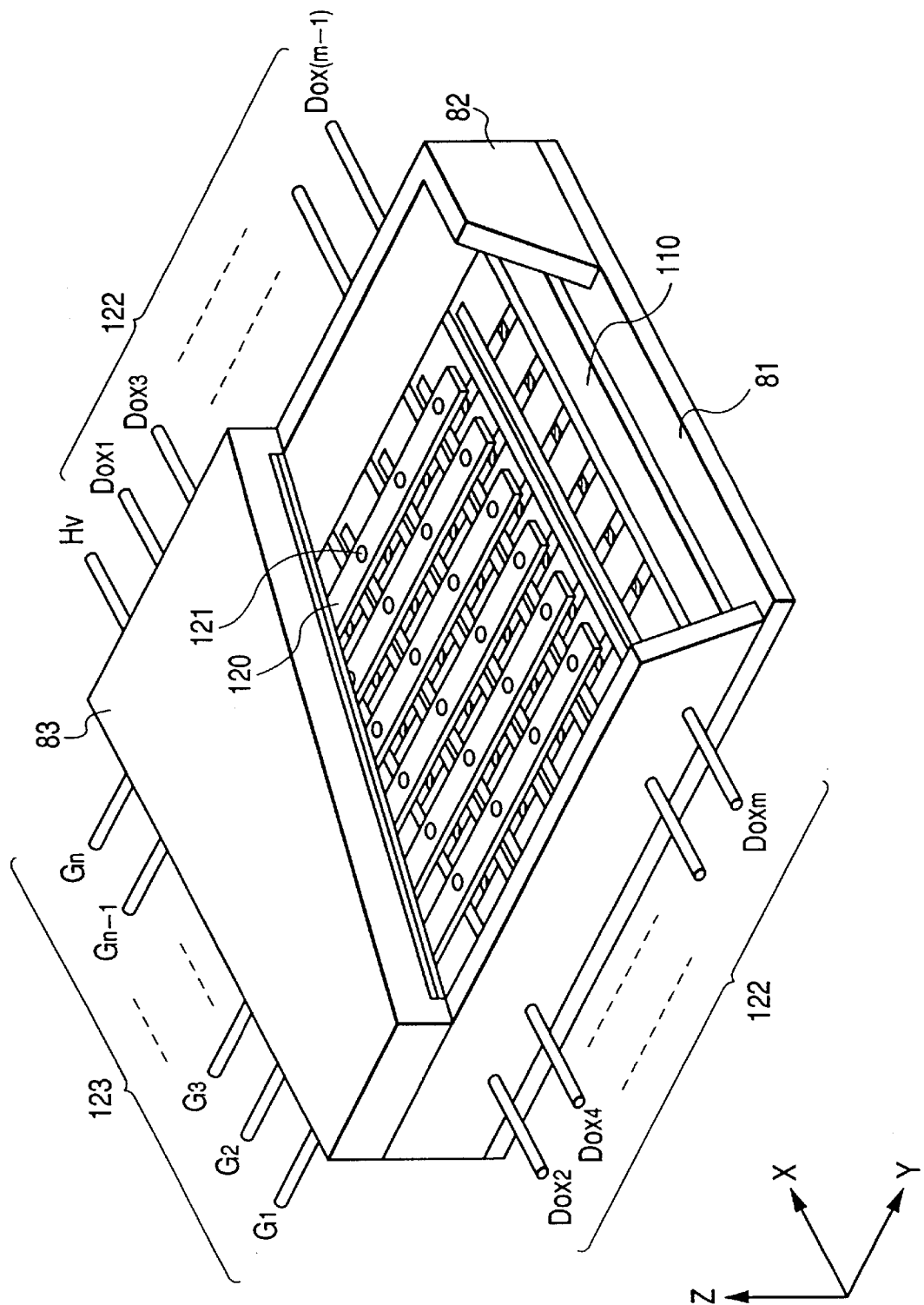
FIG. 12 is a schematic perspective view of an image-forming apparatus according to the invention and having an alternative configuration.

FIG. 12 is a schematic perspective view of the display panel of an image-forming apparatus incorporating an electron source having a ladder-like arrangement of electron-emitting devices. In FIG. 15, the display panel comprises grid electrodes 120, each provided with a number of bores for allowing electrons to pass therethrough, through holes 121 for passing electrons therethrough and a set of external terminals Dox1, Dox2, . . . , Doxm, or 122 collectively. It also comprises another set of external terminals G1, G2, . . . , Gn, or 123 collectively, connected to the respective grid electrodes 120 and an electron source substrate 124. Note that the components of the image-forming apparatus of FIG. 12 and the corresponding components of FIGS. 8 and 11 are denoted respectively by the same reference symbols. The image forming apparatus of FIG. 12 differs from the image forming apparatus with a simple matrix arrangement of FIGS. 8 and 11 mainly in that the apparatus of FIG. 12 has grid electrodes 120 arranged between the electron source substrate 110 and the face plate 86.

In FIG. 12, the stripe-shaped grid electrodes 120 are arranged between the substrate 110 and the face plate 86 perpendicularly relative to the ladder-like device rows for modulating electron beams emitted from the surface conduction electron-emitting devices, each provided with through bores 121 in correspondence to respective electron-emitting devices for allowing electron beams to pass therethrough. Note that, however, while stripe-shaped grid electrodes are shown in FIG. 12, the profile and the locations of the electrodes are not limited thereto. For example, they may alternatively be provided with mesh-like openings and arranged around or close to the surface conduction electron-emitting devices.

The external terminals 122 and the external terminals 123 for the grids G1 through Gn are electrically connected to a control circuit (not shown).

An image-forming apparatus having a configuration as described above can be operated for electron beam irradiation by simultaneously applying modulation signals to the rows of grid electrodes for a single line of an image in synchronism with the operation of driving (scanning) the electron-emitting devices on a row by row basis so that the image can be displayed on a line by line basis.

Thus, a display apparatus according to the invention and having a configuration as described above can have a wide variety of industrial and commercial applications because it can operate as a display apparatus for television broadcasting, as a terminal apparatus for video teleconferencing, as an editing apparatus for still and movie pictures, as a terminal apparatus for a computer system, as an optical printer comprising a photosensitive drum and in many other ways.

<A Preliminary Study>

A preliminary study was conducted on the formation of a "de-sodiumized" layer on a soda lime glass substrate and the Na diffusion into the "de-sodiumized" layer due to a heat treatment. This will be discussed below.

In an experiment, a number of soda lime glass substrates ($SiO_2$:74%, $Na_2O$:12%, CaO:9%, $K_2O$:3%, MgO:2%) were heated in a gas flow of a mixture of $SO_2$ gas and air and then washed with hot water. Thereafter, the substrates were heated to 120° C. and dried.

As each of the glass substrates contacted $SO_2$ gas, while it was held to a temperature level close to the glass transition temperature, Na contained in the glass reacted with $SO_2$ to deposit $Na_2SO_4$ on the surface. While other substances such as K and Ca might have reacted also, only Na was mainly removed from the glass substrate because of the fast ion diffusion speed of Na so that a "de-sodiumized" layer containing Na to a reduced extent was formed on the surface of the soda lime glass substrate. Since $Na_2SO_4$ is water-soluble, it can be removed by washing the substrate with hot water. What little K and Ca sulfates that had also been deposited were also removed by hot water.

The "de-sodiumized" layer formed by the above process could be regulated by appropriately selecting the temperature and the duration of the reaction. The thickness of the obtained layer was determined by secondary ion mass spectrography (SIMS).

Then, the substrates were heat treated to see the relationship between the Na concentration on the surface of the "de-sodiumized" layer and the thickness of the "de-sodiumized" layer that had been formed initially. A SIMS was used for this observation.

The heat treatment was conducted at 350° C. for 10 minutes. These values represent typical conditions for transforming a film of an organic Pd compound into a PdO film. Equation (1) was used for soda lime glass substrates containing $Na_2O$ by 12% (of the substrates used in this preliminary study: corresponding to 20 at % as Na concentration to the content of all the metal elements). As described earlier, the "de-sodiumized" layer "having an Na concentration to the content of all the metal elements which is not greater than 2 at % on the surface" had a thickness of about 10 μm.

As a result of the preliminary study, it was found that any increase in the Na concentration on the surface due to a heat treatment is negligible when the "de-sodiumized" layer has a thickness greater than 10 μm. Therefore, the study suggests that a "de-sodiumized" layer having a thickness equal to the value determined by equation (1) of about 2.4 times of the value of $(Dt)^{1/2}$ can effectively eliminate the adverse effect of diffusing Na onto the surface of the substrate that can be caused by a heating process.

Now, the present invention will be described further by way of examples.

EXAMPLE 1, COMPARATIVE EXAMPLES 1 AND 2

(Step-1)

Soda lime glass substrates ($SiO_2$:74%, $Na_2O$:12%, CaO:9%, $K_2O$:3%, MgO:2%) were heated at 550° C. in a gas flow of a mixture of $SO_2$ gas and air and then washed with hot water and dried to produce a "de-sodiumized" layer on the surface of each of the substrates (FIG. 3A) for Example 1 and Comparative Example 2. The "de-sodiumized" layer was made to have a thickness of 5 μm on the substrates for Comparative Example 2 and 10 μm on the substrates for Example 1 by controlling the duration of the heat treatment. For the purpose of comparison, soda lime glass substrates with the same composition that had not been heat treated and only washed with detergent and hot water were prepared (Comparative Example 1). A total of ten specimens were prepared for each of the examples to see the reproducibility of this technique.

(Step-2)

Then, for each of the substrates, a photoresist layer was formed on the "de-sodiumized" layer of the substrate (or directly on the substrate if it does not have a "de-sodiumized" layer) and openings, each having a contour that corresponds to the contour of a device electrode, were bored through the photoresist layer by photolithography. Then, a 5 nm thick Ti film layer and a 100 nm thick Pt film layer were sequentially formed thereon by vacuum evaporation and the photoresist layer was removed by dissolving it with an organic solvent. Then, device electrodes 2 and 3 were formed by lift-off for each electron-emitting device to be formed thereon (FIG. 3B). The device electrodes 2 and 3 were separated by a gap L of 50 μm and had a length of W=500 μm.

(Step-3)

Then, an electroconductive film was formed thereon for each of the electron-emitting devices. Firstly, a 50 nm thick Cr film was formed by vacuum evaporation to produce a mask for patterning the electroconductive film and then an opening having a contour that corresponds to the contour of an electroconductive film 4 was bored therethrough. Thereafter, a solution of Pd acetate monoethanol amine complex was applied to the opening by means of a spinner, dried and then heat treated at 350° C. for 10 minutes in the air to produce a electroconductive film comprising fine particles and containing PdO as principal ingredient. Subsequently, the Cr was removed by wet-etching and a electroconductive film 4 having an intended profile was produced by lift-off (FIG. 3C). The electroconductive film had a thickness of about 10 nm and a width W' of about 300 μm. The sheet resistance of the electroconductive film was $6 \times 10^4$ Ω/□ for Example 1 and about 2 to $5 \times 10^4$ Ω/□ for Comparative Examples 1 and 2. It was found that the resistance of the electroconductive film 4 (PdO fine particle film) decreases gradually in an uncontrollable way if the "de-sodiumized" layer has a thickness smaller than 10 μm.

Thereafter, each of the specimens was placed in a vacuum processing system as shown in FIG. 5. Referring to FIG. 5, it includes a vacuum chamber 55 and an evacuation device 56. Otherwise, the system has a power source 51 for applying a voltage between the device electrodes of each electron-emitting device to cause an electric current to flow, an ammeter 50 for metering the electric current (device current If) running through the thin film 4 between the device electrodes 2 and 3 of the electron-emitting device, an anode 54 for capturing the emission current Ie produced by electrons emitted from the electron-emitting region of the device, a high voltage source 53 for applying a voltage to the anode 54 of the gauging system and another ammeter 52 for metering the electric current (emission current Ie) produced by electrons emitted from the electron-emitting region 5 of the device.

(Step-4) <forming step>

The inside of the vacuum chamber was evacuated to a pressure level of $1.3 \times 10^{-4}$ Pa. Subsequently, a pulse voltage was repeatedly applied between the device electrode of each of the devices from the power source 51. FIG. 4B shows the waveform of the applied voltage. The pulse voltage was a rectangular pulse voltage whose peak value gradually increased with time as shown in FIG. 4B. The pulse width of T1=1 msec and the pulse interval of T2=10 msec were used. During the electric forming process, an extra pulse voltage of 0.1V was inserted into intervals of the forming pulse voltage in order to detect the resistance between the device electrodes. The application of the pulse voltage was terminated when the resistance exceeded 1M. An electron-emitting region 5 was produced as a result of this step (FIG. 3D).

The peak value of the pulse voltage was 5.0 to 5.1 V when the forming process was terminated.

(Step-5)

A mixture gas of Na:97%—$H_2$:2% was introduced into the vacuum chamber to produce a pressure of 1 atm., which pressure was maintained for 10 minutes. Specimens of Example 1 and Comparative Examples 1 and 2 that had been processed down to Step-3 were placed in the vacuum chamber at the same time for monitoring and observed for the change in the electric resistance. As for the monitored specimen of Example 1, the electric resistance between the device electrodes started decreasing 5 minutes after the introduction of the mixture gas but the decrease was terminated 8 minutes thereafter to show a total decrease of about two digits. On the other hand, the decrease in the electric resistance was very slow and did not terminate in 10 minutes in Comparative Examples 1 and 2. Particularly, in Comparative Example 1, the total decrease in the electric resistance was less than a digit.

(Step-6) <activation step>

The inside of the vacuum chamber 55 was evacuated once again to a pressure level of lower than $1.3 \times 10^{-4}$ Pa and subsequently acetone vapor was introduced into the vacuum chamber 55 until the internal pressure of the chamber was raised to $2.7 \times 10^{-1}$ Pa. Then, a rectangular pulse voltage with a wave height of 20V was applied between the device electrodes of each of the devices from the power source 51. During this step, the device current observed by way of the ammeter 50 increased gradually to get to a saturation point in about 30 minutes.

(Step-7) <stabilization step>

In this step, the entire vacuum chamber 55 was heated to 150° C. by means of a heater (not shown) and evacuated. After 10 hours from the start, the internal pressure of the vacuum chamber fell to about $1.3 \times 10^{-5}$ Pa.

Then, the power source supplying power to the heater was switched off to cool the inside to room temperature. Then, the electron emitting performance of each of the prepared electron-emitting devices was observed by applying a rectangular pulse voltage of 20V with a pulse width of 1 msec. and a pulse interval of 10 msec. between the device electrodes. The potential of the anode electrode was 1 kV and the electron-emitting device and the anode electrode were separated by a distance of H=4 mm. The observed device current If and emission current Ie of the ten devices are shown in Table 1 below for each of the examples.

TABLE 1

|  | device current If (mA) | emission current Ie (μA) |
| --- | --- | --- |
| Example 1 | 1.9 to 2.3 | 3.8 to 4.3 |
| Comp. Example 1 | 1.0 to 2.0 | 1.8 to 3.5 |
| Comp. Example 2 | 1.2 to 2.0 | 2.0 to 3.5 |

Then, each of the devices of the above examples was examined for the Na content in the electroconductive film and on the substrate surface by means of XPS. The content ratio of Na to all the metal elements in the electroconductive film was about 800 p.p.m. for Example 1, about 2,500 p.p.m. for Comparative Example 2 and about 10,000 p.p.m. for Comparative Example 1. The ratio on the substrate surface was about 1.5 at % for Example 1, about 23 at % for Comparative Example 2 and about 30 at % for Comparative Example 1.

The Na concentration profile in the depth direction was determined by means of SIMS to show that the Na concentration decreases from the inside toward the surface as curve a in FIG. 21 for Example 1, whereas it slightly increases at the surface for Comparative Example 1 and it remarkably increases as curve b in FIG. 21 for Comparative Example 2. Also, in Example 1, the depth represented as d at which the Na concentration reaches the value of the bulk body of the substrate was about 10 µm which is the same as the original thickness of the de-sodiumized layer.

EXAMPLE 2

In this example, an electron source comprising a number of electron-emitting devices having a configuration as shown in FIGS. 1A and 1B and arranged and provided with a matrix wiring arrangement as schematically shown in FIG. 7 was prepared in a manner as described below. The process will be described for each device by referring to FIGS. 15A through 15H.

(Step-1)

A soda lime glass substrate having a composition the same as that of the substrate of Example 1 was held to 550° C. for 3 hours in a gas flow of a mixture of $SO_2$ gas and air. Then, it was washed with hot water and dried. As a result of this step, a "de-sodiumized" layer was formed on the surface to a thickness of about 50 µm.

(Step-2)

Figure 15A:
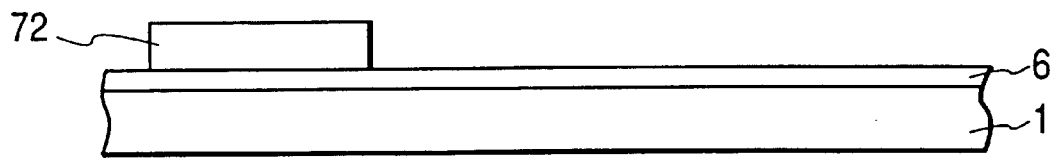
FIGS. 15A, 15B, 15C, 15D, 15E, 15F, 15G and 15H are schematic partial cross sectional views of an electron source according to the invention, showing different manufacturing steps.
Figure 15B:
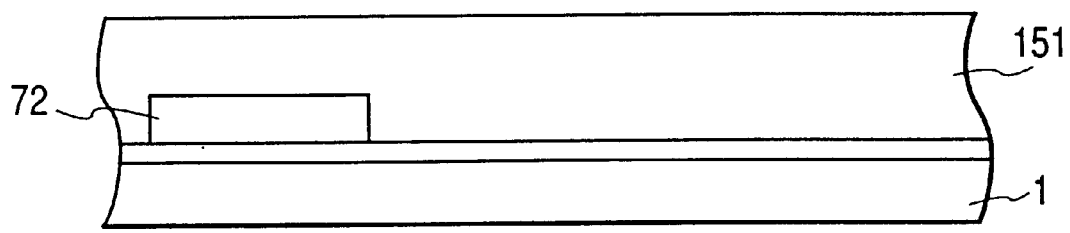

Cr and Au were sequentially laid to thicknesses of 5 nm and 600 nm respectively on the "de-sodiumized" layer (treated surface layer) 6 of the substrate 71 and then a photoresist (AZ1370: available from Honest Corporation) was formed thereon. Thereafter, a photo-mask image was exposed to light and developed to produce a resist pattern for a lower wire 72 and then the deposited Au/Cr film was wet-etched to produce the lower wire 72 (FIG. 15A).

(Step-3)

Figure 15C:
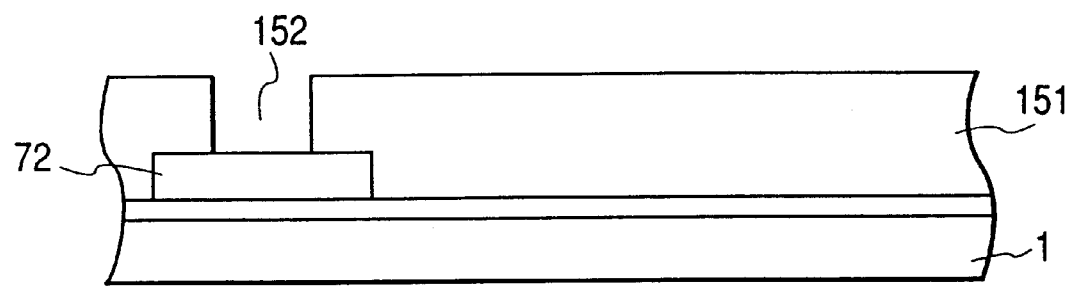

A silicon oxide film was formed as an interlayer insulation layer 151 to a thickness of 1.0 µm by sputtering (FIG. 15B) and then a photoresist pattern was prepared for producing a contact hole 152 through the interlayer insulation layer 151 by means of RIE (Reactive Ion Etching) using $CF_4$ and $H_2$ gas (FIG. 15C).

(Step-4)

Figure 15D:
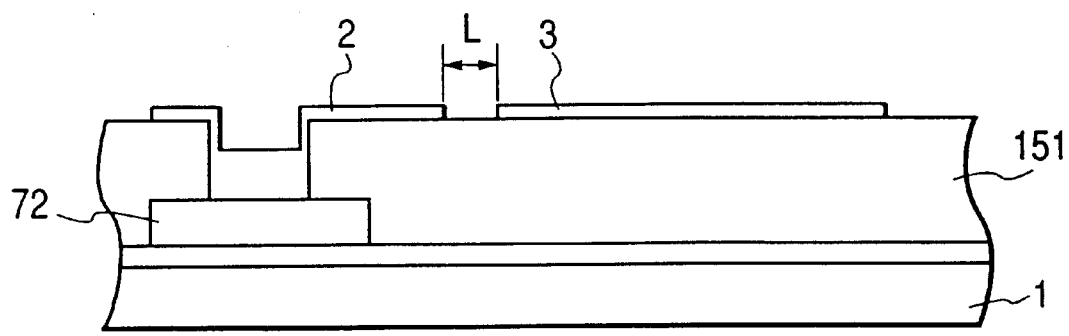

Thereafter, a mask pattern of photoresist (RD-2000N: available from Hitachi Chemical Co., Ltd.) was formed for a pair of device electrodes 2 and 3 and then Pt was deposited thereon to thicknesses of 50 nm by sputtering. The photoresist pattern was dissolved and removed by a lift-off technique to produce a pair of device electrodes 2 and 3 (FIG. 15D). The gap separating the device electrodes was equal to L=2 µm and the device electrodes had a width (W in FIG. 1A) of 300 µm.

(Step-5)

Figure 15E:
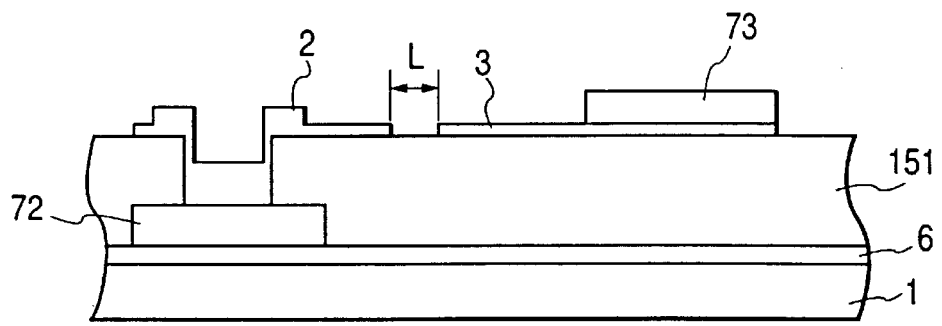

Ti and Au were sequentially deposited by vacuum deposition to respective thicknesses of 5 nm and 500 nm and then unnecessary areas were removed by means of a lift-off technique to produce a Y-directional wire (upper wire) 73 having a desired profile (FIG. 15E).

(Step-6)

Figure 15F:
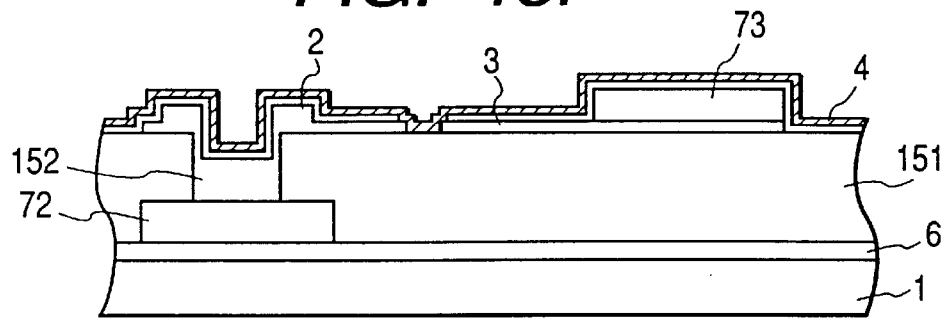
Figure 15G:
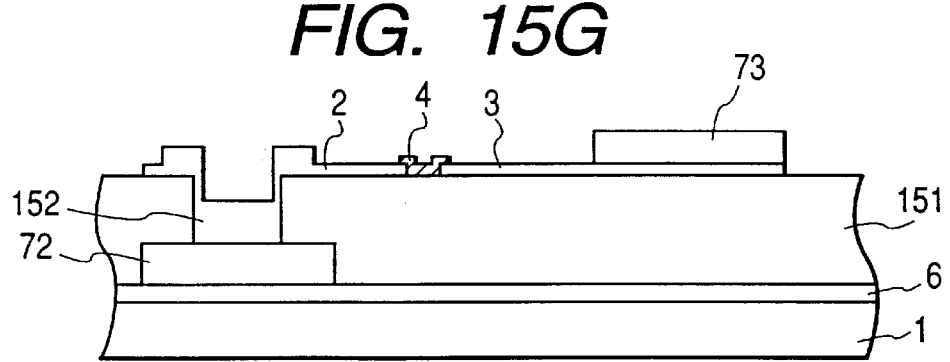

A solution of Pd acetate monoethanol amine complex was applied by means of a spinner and dried. Thereafter, the device was heated at 350° C. for 10 minutes to produce a electroconductive film comprising fine particles and containing Pd as principal ingredient (FIG. 15F). Any unnecessary areas were removed by dry etching to make the electroconductive film 4 show a desired profile (FIG. 15G). The electroconductive film showed a sheet resistance of about $5\times10^4$ Ω/□.

(Step-7)

Figure 15H:
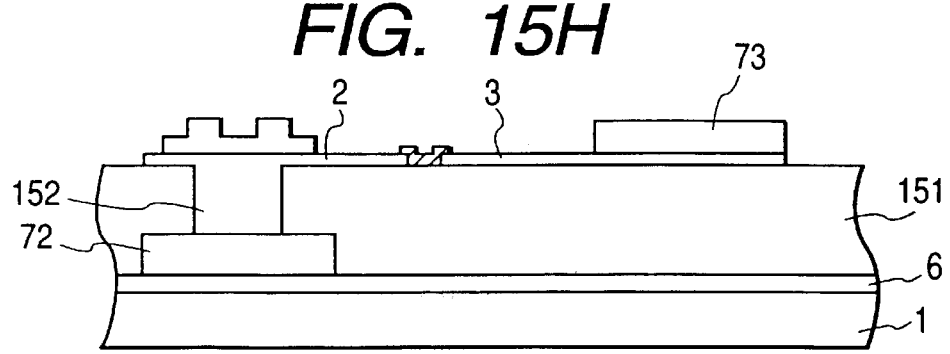

All the surface area except the contact hole 152 was covered by a photoresist and Ti and Au were deposited by vacuum evaporation to respective thicknesses of 5 nm and 500 nm. Then, the contact hole was filled by removing the photoresist and also the deposited film from the unnecessary areas (FIG. 15H).

(Step-8)

Then, the substrate 71 carrying thereon the above electron source, a rear plate 81, a face plate 86 (formed by arranging a fluorescent film 84 and a metal back 85 on the inner surface of a glass substrate) and a support frame 82 were assembled and bonded together. A getter (not shown) adapted to high frequency heating was arranged in the envelope, which was additionally provided with an exhaust pipe (not shown) for controlling the atmosphere inside the envelope. The bonding operation was performed by applying frit glass to the junctions of the components and heating the assembled envelope at 450 for 10 minutes in the atmosphere. The "de-sodiumized" layer was required to have a thickness of about 50 µm for the above heating conditions according to the calculation using equation (1) as described above. Since the substrate of this example had a 50 µm thick "de-sodiumized" layer, it should be effective for withstanding the heat treatment.

The fluorescent film 84 of this example was prepared by forming black stripes 91 and filling the gaps with stripe-shaped fluorescent members 91 of red, green and blue as schematically shown in FIG. 9A. The black stripes were made of a popular material containing graphite as a principal ingredient. A slurry technique was used for applying fluorescent materials onto the glass substrate.

A metal back 85 is arranged on the inner surface of the fluorescent film 84. After preparing the fluorescent film, the metal back was prepared by carrying out a smoothing operation (normally referred to as "filming") on the inner surface of the fluorescent film and thereafter forming thereon an aluminum layer by vacuum deposition.

While a transparent electrode (not shown) might be arranged between the fluorescent film 84 and the glass substrate 83 in order to enhance its electroconductivity, it was not used in this example because the fluorescent film showed a sufficient degree of electroconductivity by using only a metal back.

For the above bonding operation, the above described components of were carefully aligned in order to ensure an accurate positional correspondence between the fluorescent members and the electron-emitting devices.

(Step-10)

A mixture gas of $H_2$:2%—$N_2$:98% was introduced into the envelope and then left under that condition for 10 minutes to reduce the electroconductive film. Subsequently, the inside of the envelope was then evacuated to a degree of vacuum of $1.3\times10^{-4}$ Pa. Thereafter, an activation process was carried out by applying a pulse voltage with a pulse height of 20 V was sequentially applied to the device rows. The devices were activated by the organic substances remaining in the envelope as the evacuation system is operated by an oil diffusion pump. Subsequently, the main pump of the evacuation system was switched to a magnetic floating type turbo pump and the envelope was evacuated further while it was being heated to carry out a stabilization process. Thereafter, the getter arranged in the panel was heated by high frequency heating until it flashed and then the exhaust pipe was heated and molten for sealing.

EXAMPLE 3

In this example, the steps down to Step-7 of Example 2 were followed except that a Cr film was formed on the outer periphery of the substrate by evaporation so that no "de-sodiumized" layer was formed there in Step-1.

Figure 16:
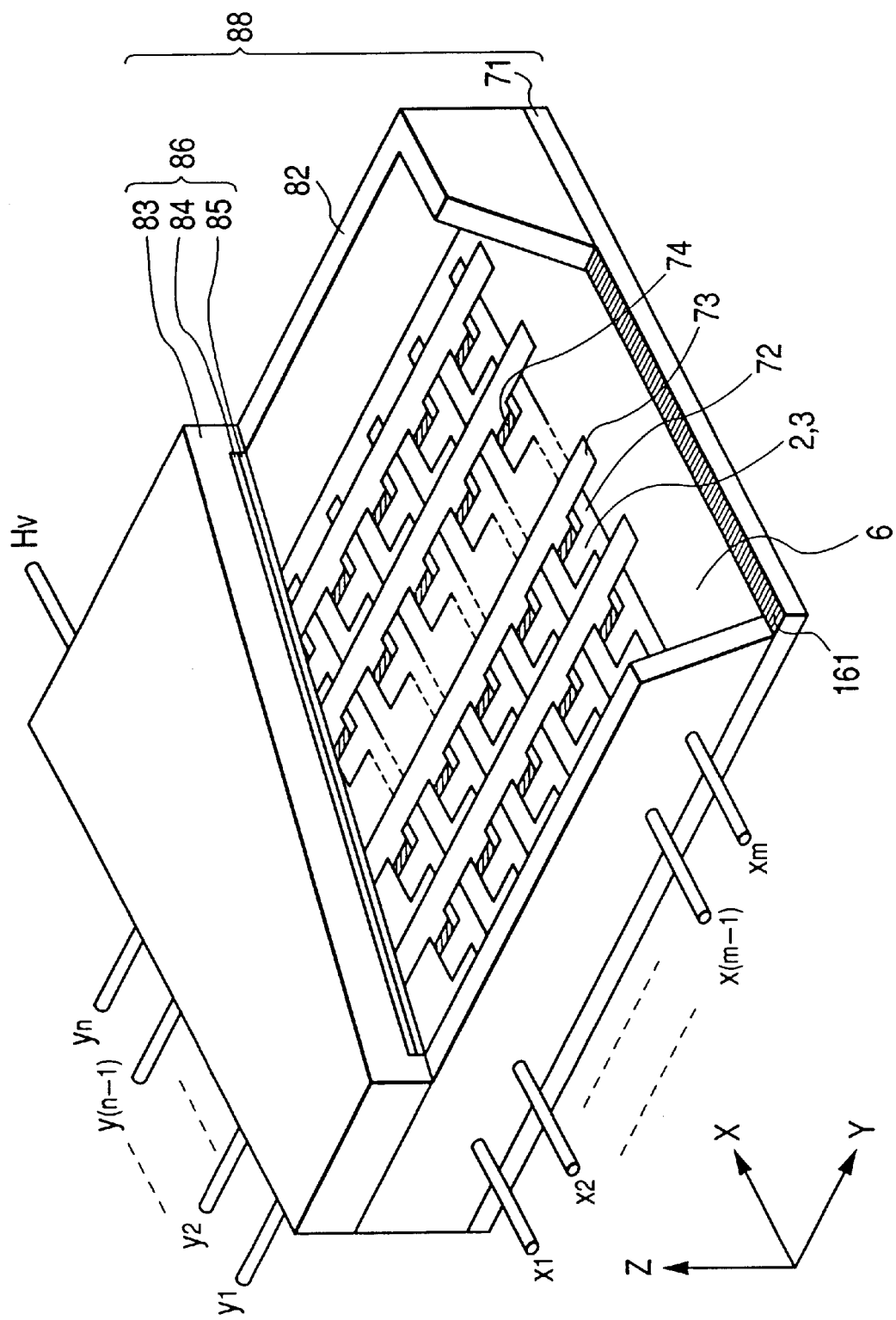
FIG. 16 is a schematic perspective view of an image-forming apparatus according to the invention and having still another alternative configuration.

Thereafter, an envelope was prepared as in Step-8 of Example-2. However, in this example, the electron source substrate took the role of a rear plate and hence no "de-sodiumized" layer was formed on the junctions 161 of the substrate 71 and the support frame 82. Then, Steps-9 and 10 of Example 2 were also followed in this example. FIG. 16 schematically illustrates the image-forming apparatus of this example.

COMPARATIVE EXAMPLE 3

An image-forming apparatus was prepared in a manner as described for Example 2 above except that the substrate was only washed with detergent and hot water in Step-1.

The image-forming apparatus of Examples 2 and 3 and Comparative Example 3 were made to display an entirely white image on the entire screen to observe the brightness distribution. It was found that the screen of Examples 2 and 3 showed a uniform distribution of brightness whereas that of Comparative Example 3 showed dark areas and hence a poor uniformity of brightness. This may be mainly because of the deviations in the rate of reducing the electroconductive film that resulted in deviations in the electric resistance to produce electron-emitting devices with different performances due the diffusion of Na ions into the electroconductive film that had been given rise to by the heat treatment for bonding the components of the envelope in Comparative Example 3. To the contrary, no diffusion of Na ions took place in the electroconductive film in Examples 2 and 3 so that a uniform distribution of brightness was maintained.

After the evaluation, the substrate of the electron source was removed and the Na concentration was measured by means of SIMS for the interlayer insulation layer and the substrate. The results showed that the Na content relative to all the metal elements at the surface was about 1.5 at % in Examples 2 and 3, whereas it was as high as 37 at % in Comparative Example 3. The Na concentration profile in the depth direction exhibited the same tendency as curve a in FIG. 21 for Examples 2 and 3 and as curve b for Comparative Example 3.

EXAMPLE 4

A soda lime glass substrate having the same composition as the counterpart of Example 1 was washed with detergent and pure water and then an aqueous solution of ammonium sulfate was sprayed onto the surface of the substrate and dried to produce a coat. Then, the substrate was heated at 550° C. for an hour.

In this example, the $Na_2O$ concentration on and near the surface of the substrate was supposed to be reduced as Na atoms in the $Na_2O$ were deposited on the surface in the form of sodium sulfate by the following reactions.

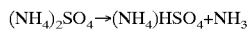

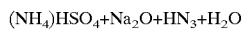

Thereafter, the substrate was washed with 80° C. water for an hour and dried. As a result, an about 10 μm thick "de-sodiumized" layer was produced. Thereafter, Step-2 and on of Examples 1 through 3 were followed to produce electron-emitting devices. When tested, they operated substantially same as their counterparts of Example 3.

The Na concentration measurement exhibited the same tendency as Example 3.

EXAMPLE 5

Figure 17:
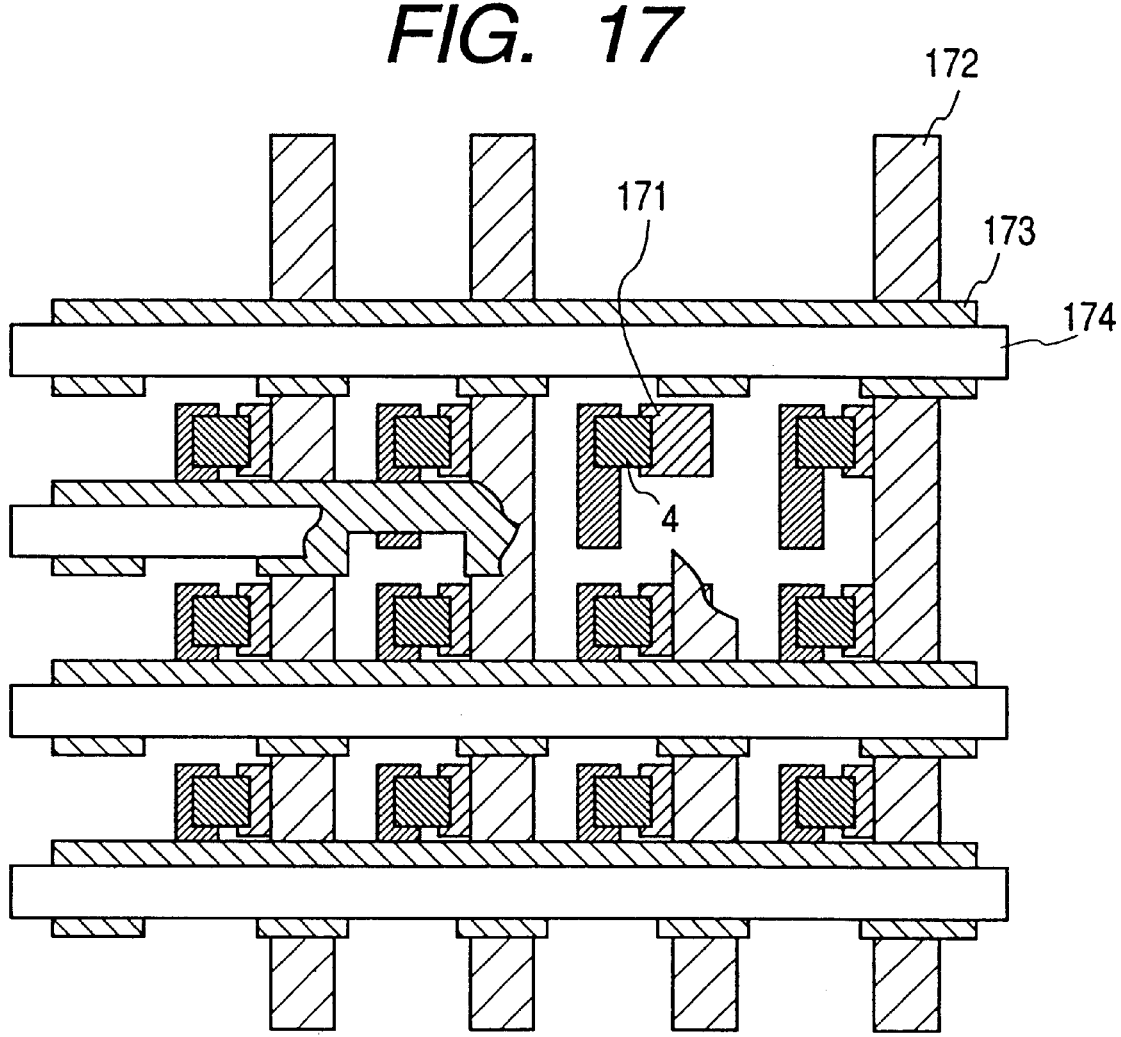
FIG. 17 is a schematic plan view of an electron source according to the invention and having still another alternative configuration.

The electron source of this example had a configuration as schematically shown in FIG. 17. Note that certain components are removed in FIG. 17 to clearly show the structure. Now, the manufacturing process used in this example will be described by referring to FIGS. 18A through 18E.
(Step-1)

A soda lime glass substrate having a composition the same as the substrate of Example 1 was washed with detergent and pure water and a pattern was formed for device electrodes 171 with MOD paste (DU-2110: available from Noritake Co., Ltd.) by screen printing. The MOD paste contained gold as metal ingredient.

Figure 18A:
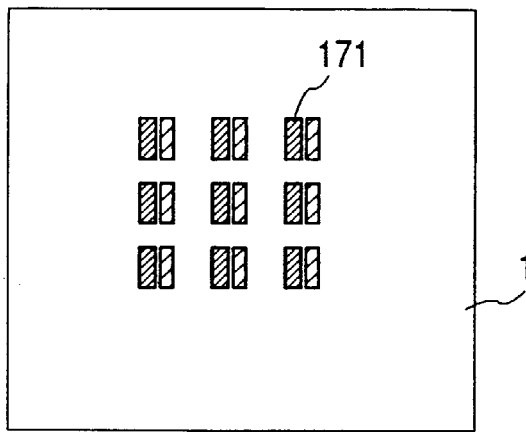
Figure 18B:
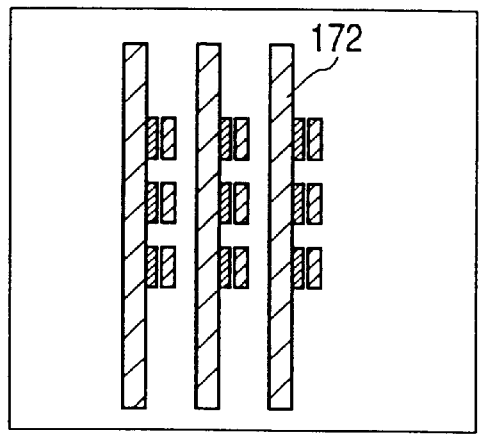

After the printing operation, the MOD paste was dried at 110° C. for 20 minutes and then baked by means of a heat treatment system, keeping a peak temperature of 580° C. for 8 hours, to produce 0.3 μm thick device electrodes 151. The distance separating each pair of device electrodes was 70 μm (FIG. 18A). $SO_2$ gas was generated during the process of baking the MOD paste to produce a "de-sodiumized" layer on the surface of the soda lime glass substrate.
(Step-2)

Then, a pattern for the lower wires 172 was prepared by means of a pasty material containing silver as metal ingredient (NP-4028A: available from Noritake Co., Ltd.) and screen printing. Then, it was baked to produce lower wires under the conditions same as those in Step-1 described above (FIG. 18B).
(Step-3)

Figure 18C:
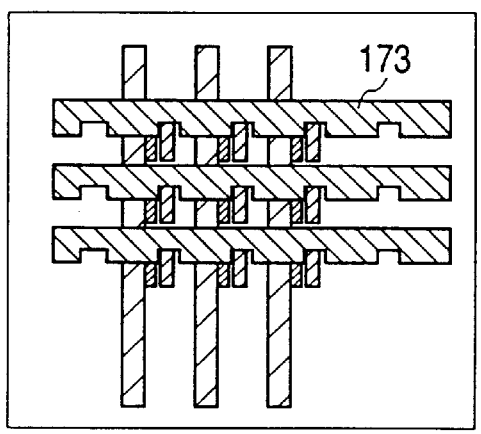
Figure 18D:
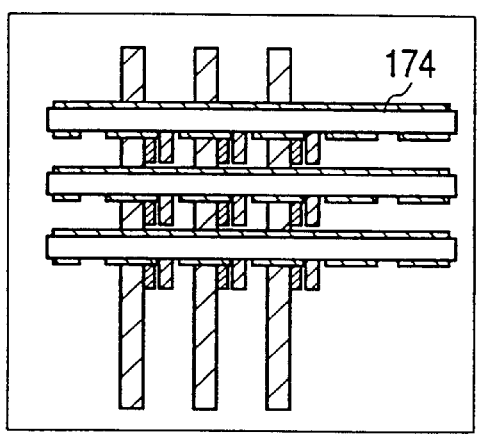

A pattern for an interlayer insulation layer 173 was prepared by using paste containing PbO as principal ingredient and printing. The pattern was then baked under conditions the same as those in Step-1 described above to produce an interlayer insulation 173 (FIG. 18C). The interlayer insulation layer is notched to allow one of the device electrodes of each electron-emitting device and the corresponding upper wire, which was to be prepared in a later step, to be connected with each other.
(Step-4)

Upper wires 174 were prepared in a manner as described in Step-2 (FIG. 18D) and the wired substrate was washed with hot water. As a result, the sodium sulfate deposited on the surface in Step-1 was removed along with the dirt adhered to the surface in the subsequent steps.
(Step-5)

Figure 18E:
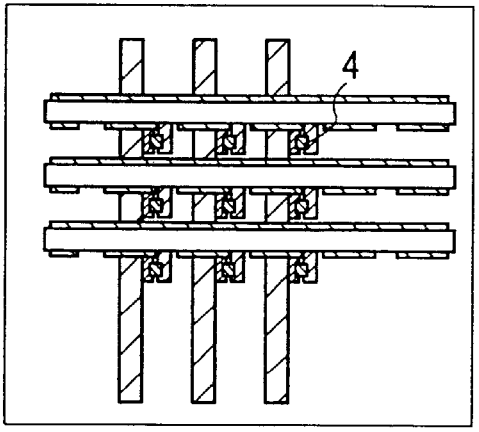
Figure 19A:
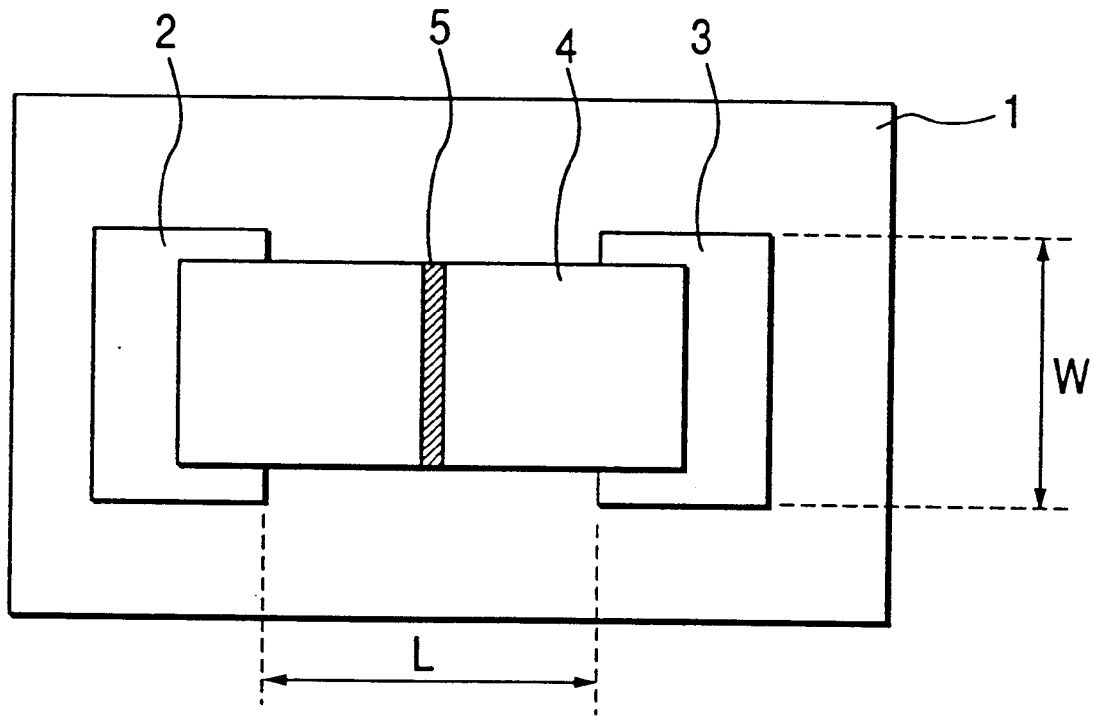
FIG. 19A is a schematic plan view of a known surface-conduction electron-emitting device.
Figure 19B:
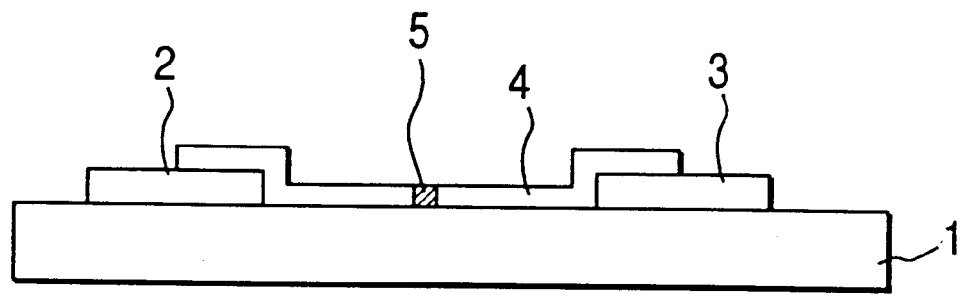
FIG. 19B is a schematic cross sectional view of the surface-conduction electron-emitting device of FIG. 19A.

Thereafter, a electroconductive film was formed for each electron-emitting device in a manner as described in Step-6 of Example 2 (FIG. 18E).

Then, an image-forming apparatus was prepared, following the steps of Example 2. The prepared image-forming apparatus operated substantially same as its counterpart of Example 2.

EXAMPLE 6

A Cr film was formed on the outer periphery of the substrate of this example by evaporation as in Example 3. Then, an aqueous solution of ammonium sulfate was sprayed onto the surface of the substrate to produce a coat as in Example 4. Then, the coat was dried and heated at 550° C. for 5 hours. Thereafter, it was washed with hot water and dried.

Then, an image-forming apparatus was prepared, following the steps of Example 5. The prepared image-forming apparatus operated substantially same as its counterpart of Example 2.

EXAMPLE 7

The steps of Example 5 were followed to produce an image-forming apparatus. However, when the MOD paste was baked, a metal mask was applied to the outer periphery of the substrate to prevent the area from contacting $SO_2$ gas emitted from the MOD paste. Then, an image-forming apparatus was prepared, following the steps of Example 5. The prepared image-forming apparatus operated substantially the same as its counterparts of Examples 2 and 5.

After the evaluation, the Na concentration was measured by means of SIMS for Examples 5 to 7. The Na content to all the metal elements at the surface was less than 2 at % and showed the same tendency in the profile in the depth direction as curve a in FIG. 21.

EXAMPLE 8

A soda lime glass substrate having a composition the same as the counterpart of Example 1 was washed with detergent and pure water and then dried. Thereafter, a sodium-capturing layer of glass (PSG) containing phosphor was formed to a thickness of about 3 μm by using tetraethylorthosilicate (TEOS) and trimethylphosphate (TMP) as source gases and by means of an atmospheric pressure CVD system. The phosphor content of the film could be controlled by modifying the mixture ratio of the two source gases. A ratio of 3% was used in the example.

Then, Steps-2 through 7 of Example 1 were followed to produce electron-emitting devices. When tested, they operated substantially the same as their counterparts of Example 1.

It seems that Na and P were combined in the sodium-capturing layer to lower the rate of Na diffusion from the level in ordinary glass. Therefore, a sodium-capturing layer that is less thick than the "de-sodiumized" layer of Example 1 operated as effectively as the latter.

The Na concentration measurement by SIMS showed that the Na content to all the metal elements was less than 2 at % and the profile in the depth direction had the same tendency as curve a in FIG. 21 except for a small jump at the boundary between the soda lime glass and the Na capturing layer.

EXAMPLE 9

A 4 μm thick sodium-capturing layer of potassium-replaced glass was formed on the surface of a soda lime glass substrate and Steps-2 through 7 of Example 1 were followed to produce electron-emitting devices, which operated substantially the same as their counterparts of Example 1. The Na diffusion is retarded by a so-called alkali mixture effect in a potassium-replaced glass to reduce the diffusion coefficient by a digit. This effect is caused to occur in a broad range of Na/K ratio and therefore, the Na/K ratio need not be very strictly controlled. Therefore, it may be safe to assume that the "de-sodiumized" layer of Example 1 and a sodium-capturing layer having a thickness of about ⅓ of the former shows substantially the same effect. The assumption was proved to be correct by this example.

The sodium-capturing layer of potassium-replaced glass was prepared by immersing a soda lime glass having a composition the same as the substrate of Example 1 into molten potassium nitrate heated to about 500° C. so that the sodium atoms in the uppermost 3 μm layer were partially replaced by potassium atoms.

The Na concentration measurement showed that the content of Na relative to all the metal elements was 5 at % and the profile in the depth direction had the same tendency as curve a in FIG. 21. Since the exchange between Na and K was not perfect, a slightly higher value of 5 at % was observed than the other examples, but it appears that since the diffusion rate of Na in the Na capturing layer is originally low, the adverse effect on the electroconductive film was suppressed as in the other examples.

COMPARATIVE EXAMPLE 4

Electron-emitting devices were prepared as in Example 8 except that the sodium-capturing layer of PSG was made to have a thickness of 2 μm.

COMPARATIVE EXAMPLE 5

Electron-emitting devices were prepared as in Example 9 except that the sodium-capturing layer of potassium-replaced glass was made to have a thickness of 2 μm.

The specimens of Comparative Examples 4 and 5 were tested as in Example 1 to find that they operated substantially the same as their counterpart of Comparative Example 2, or poorly if compared to the specimens of Examples 8 and 9. The Na concentration in the electroconductive film and on the surface of the substrate and its depth profile were observed by SIMS to find that it was substantially the same as in Comparative Example 2. This may be because the sodium-capturing layer was not sufficiently thick and the progress of the reducing reaction was retarded by Na atoms entering the electroconductive film containing PdO.

EXAMPLE 10

After cleansing a soda lime glass substrate having a composition as the substrate of Example 1, the process of Example 9 was followed to produce a sodium-capturing layer of potassium-replaced glass on the surface. The duration of the process was so controlled as to make the layer 17 μm thick. Subsequently, an image-forming apparatus comprising an electron source having a matrix wiring was prepared by following Steps-2 through 10 of Example 2. When observed, it showed a brightness distribution the same as its counterpart of Example 2. The sodium-capturing layer of this example was about ⅓ of the "de-sodiumized" layer of Example 2 but operated as effectively as the latter to prove the validity of the above described theory.

EXAMPLE 11

In this example, a 5 μm thick "de-sodiumized" layer by using Step-1 of Comparative Example 3 and then a 2 μm thick sodium-capturing layer of PSG (with a phosphor content of 3%) was formed thereon as in Example 8.

Thereafter, electron-emitting devices were prepared by following Steps-2 through 7 of Example 1. When tested, they operated as effectively as their counterparts of Example 1.

The Na concentration measurement showed that the content of Na relative to all the metal elements was 5 at % and the profile in the depth direction had the same tendency as curve a in FIG. 21. Since the exchange between Na and K was not perfect, a slightly higher value of 5 at % was observed than the other examples, but it appears that since the diffusion rate of Na in the Na capturing layer is originally low, the adverse effect on the electroconductive film was suppressed as in the other examples.

EXAMPLE 12

A soda lime glass substrate having a composition as the substrate of Example 1 was washed with detergent and pure water. Then, an aqueous solution of ammonium sulfate was sprayed onto the surface of the substrate and dried to form a coat. Thereafter, the substrate was heated at 550° C. for an hour and then washed with 80° C. water and dried. Subsequently, a sodium-capturing layer of PSG was formed by using the process of Example 8. The sodium-capturing layer was 1 μm thick and the phosphor content was 5% in this example.

Thereafter, electron-emitting devices were prepared by following Steps-2 through 7 of Example 1. When tested, they operated as effectively as their counterparts of Example 1.

The Na concentration measurement showed that the content of Na relative to all the metal elements was 5 at % and the profile in the depth direction had the same tendency as curve a in FIG. 21. Since the exchange between Na and K was not perfect, a slightly higher value of 5 at % was observed than the other examples, but it appears that since the diffusion r ate of Na in the Na capturing layer is originally low, the adverse effect on the electroconductive film was suppressed as in the other examples.

EXAMPLE 13

A "de-sodiumized" layer was formed on the surface of a soda lime glass substrate as in Step-1 of Example 2. However, the duration of the process was an hour and the layer had a thickness of about 10 μm in this example.

Subsequently, a sodium-capturing layer of PSG was formed by using the process of Example 8. The sodium-capturing layer was 1.5 μm thick and the phosphor content was 3% in this example.

Then, an electron source with a matrix wiring arrangement and an image-forming apparatus comprising the electron source were prepared by following Steps-2 through 10 of Example 2.

EXAMPLE 14

An electron source and an image-forming apparatus prepared in this example the same as their counterparts of Example 13 and the process of Example 13 was also followed. However, a sodium-capturing layer 7 was formed on the interlayer insulation layer 131 in this example. In other words, a sodium-capturing layer was formed after forming an interlayer insulation layer.

EXAMPLE 15

A Cr film was formed on the outer periphery of a soda lime glass substrate by evaporation and the substrate was heat-treated at 550° C. for 3 hours in a gas flow of a mixture of $SO_2$ gas and air as in Example 5. Then, it was washed with hot water and dried to produce an about 10 μm thick "de-sodiumized" layer. Thereafter, a 1.5 μm thick sodium-capturing layer of PSG was formed thereon as in Example 13. The Cr evaporation film was removed subsequently.

Then, and electron source an image-forming apparatus comprising the electron source were prepared by following the process of Example 5.

The image-forming apparatus of Examples 13 through 15 were tested to find that they operated substantially the same as their counterparts of Examples 2 and 5.

Na concentration was very similar to that of Example 1, except for a small jump at the boundary between the sodium-capturing layer and the soda lime glass.

EXAMPLE 16

A 10 μm thick "de-sodiumized" layer was formed on a soda lime glass substrate as in Example 1 and then the substrate was subjected to an ozone-ashing process by irradiating it with ultra-violet rays for 3 hours in an UV ozone-ashing system having an oxygen atmosphere. While no heating means was specifically used for this process, the surface of the substrate seemed to be heated to a considerable temperature level as it was intensely irradiated with UV rays. Then, the substrate was washed with hot water and dried and electron-emitting devices were formed thereon by following the steps of Example 1. A device specimen was observed for the change in the electric resistance in Step-5 as in Example 1 to find that the change in the electric resistance terminated in about 20 minutes as in Example 1. The resistance showed a value equal to about 80% of the resistance of Example 1. After forming the electron-emitting devices, they were tested for electron emission under the conditions described in Example 1 to find a device current If of 2.0–2.3 mA and an emission current Ie of 4.0–4.5 A to prove a slight increase in the emission current from the level of Example 1. This may be explained by that, as a result of a slightly decreased electric resistance of the electroconductive film, the voltage fall at the resistor film was also decreased to slightly push up the voltage that was effectively applied to the electron-emitting region.

The sulfur content was observed by means of XPS and SIMS after the ozone-ashing process to find that it was less than 0.1 at % at 5 nm below the substrate surface and the sulfur content of the zone below the 0.01 μm thick "de-sulfurized surface layer" had been slightly raised. When the electroconductive film was observed also by SIMS, the sulfur content was found to be less than 0.1 at %.

In each case, Na concentration was less than 2 at % relative to all the metal elements and the profile in the depth direction was very similar to that of Example 2, except for a small jump at the boundary between the sodium-capturing layer and the de-sodiumized layer.

While the reason for the fall of the sulfur content is to be investigated, the inventors assume that sulfur was diffused into the electroconductive film to produce PdS, which was not reduced to Pd and deposited on the surface of the fine particles of the electroconductive film and obstructed the progress of the reducing reaction inside the fine particles to consequently increase the electric resistance. Sulfur is believed to be diffused in glass very slowly if compared with sodium and the 0.01 μm thick "de-sulfurized layer" gave rise to the above result.

EXAMPLE 17

After treating a soda lime glass substrate by following Steps-1 through 4 of Example 5, a de-sulfurized layer was formed by irradiating it with UV rays for 3 hours in an oxygen atmosphere by means of a UV-ray ozone-ashing system described above in Example 16. Then, the process of Example 5 was followed to produced an image-forming apparatus and its performance was observed. The uniformity of brightness of the image-forming apparatus was substantially the same as its counterpart of Example 5 but showed a slight increase in the emission current and therefore in the brightness from Example 5 as in the case of Example 16. The inventors believe that this was attributable to the electric resistance being slightly lowered by the de-sulfurized layer as described above in Example 16.

S and Na concentrations were determined in the same manner as Example 16 to provide similar results.

Advantages of the Invention

As described above, by forming a "de-sodiumized" layer and/or a sodium-capturing layer or a de-sulfurized layer on the surface of the substrate of an electron source or an image-forming apparatus comprising the electron source, the electron-emitting devices of the electron source are prevented from diversions in the performance that are attributable to Na and/or S it contains. Thus, a soda lime glass substrate that is advantageous in terms of workability and manufacturing cost can be used for manufacturing electron-emitting devices, an electron source comprising such devices and an image-forming apparatus comprising such an electron source.

What is claimed is:

1. A method of manufacturing an electron source comprising a substrate and an electron-emitting device arranged on the surface of said substrate, comprising a step of forming the electron-emitting device on the substrate that contains sodium, the sodium concentration of the substrate being reduced in the vicinity of the surface carrying the electron-emitting device as compared to that of the bulk body of the substrate, wherein the step of forming the electron-emitting device includes a heat treatment that is carried out at a temperature between 250° C. and 400° C. for a treatment time between 300 sec. and 1200 sec., and a layer with a sodium concentration smaller than that of the bulk body of the substrate is formed to a depth between 1 $\mu$m and 40 $\mu$m from the substrate carrying the electron-emitting device.

2. A method of manufacturing an electron source according to claim 1, wherein the substrate is prepared by subjecting a sodium-containing glass to a treatment in which sodium is deposited on the surface of the glass as sulfate.

3. A method of manufacturing an electron source according to claim 1, wherein the sodium concentration on the surface of the substrate carrying the electron-emitting device is not greater than 2%.

4. A method of manufacturing an electron source according to claim 1, wherein the substrate comprises a phosphor containing layer on the surface carrying the electron-emitting device.

5. A method of manufacturing an electron source according to claim 4, wherein the phosphor concentration of the phosphor containing layer of the substrate is in the range of between 3% and 10%.

6. A method of manufacturing an electron source comprising a substrate and an electron-emitting device arranged on the surface of said substrate, comprising a step of forming the electron-emitting device on the substrate that contains sodium, the sodium concentration of the substrate being reduced in the vicinity of the surface carrying the electron-emitting device as compared to that of the bulk body of the substrate, wherein a layer with a composition such that sodium is partially replaced by potassium based on the composition of the bulk body of the substrate is formed to constitute the surface carrying the electron-emitting device.

7. A method of manufacturing an electron source according to any of claims 1 through 3 and 4 through 6, wherein said electron-emitting device comprises an electroconductive film including an electron-emitting region and arranged between a pair of device electrodes.

8. A method of manufacturing an electron source comprising a substrate and an electron-emitting device arranged on the surface of said substrate, comprising a step of forming the electron-emitting device on the substrate that contains sodium, the sodium concentration of the substrate being reduced in the vicinity of the surface carrying the electron-emitting device as compared to that of the bulk body of the substrate, wherein the substrate further contains sulfur and a layer with a sulfur concentration smaller than that of the bulk body of the substrate is formed to a depth greater than 0.01 $\mu$m from the surface carrying the electron-emitting device, the sulfur concentration of the layer being not greater than 0.1%.

9. A method of manufacturing an electron source according to claim 8, wherein the substrate is prepared by subjecting a sodium-containing glass to a treatment in which sodium is deposited on the surface of the glass as sulfate.

10. A method of manufacturing an electron source according to claim 8, wherein the sodium concentration on the surface of the substrate carrying the electron-emitting device is not greater than 2%.

11. A method of manufacturing an electron source according to claim 8, wherein the step of forming the electron-emitting device includes a heat treatment and a layer with a sodium concentration smaller than that of the bulk body of the substrate is formed to a depth between 1 $\mu$m and 40 $\mu$m from the substrate carrying the electron-emitting device.

12. A method of manufacturing an electron source according to claim 11, wherein the heat treatment is carried out at a temperature between 250° C. and 400° C. for a treatment time between 300 sec. and 1200 sec.

13. A method of manufacturing an electron source according to claim 8, wherein the substrate comprises a phosphor containing layer on the surface carrying the electron-emitting device.

14. A method of manufacturing an electron source according to claim 13, wherein the phosphor concentration of the phosphor containing layer of the substrate is in the range of between 3% and 10%.

15. A method of manufacturing an electron source according to claim 8, wherein a layer with a composition such that sodium is partially replaced by potassium based on the composition of the bulk body of the substrate is formed to constitute the surface carrying the electron-emitting device.

16. A method of manufacturing an image-forming apparatus comprising a substrate, electron-emitting devices arranged on the surface of the substrate and an image-forming member for forming images as irradiated with electrons emitted from the electron-emitting devices, comprising a step of forming the electron-emitting devices on the substrate that contains sodium, the sodium concentration of the substrate being reduced in the vicinity of the surface carrying the electron-emitting devices as compared to the bulk body of the substrate, wherein the method further comprises a step of binding components of the image-forming apparatus and a layer with a sodium concentration smaller than that of the bulk body of the substrate is formed to a depth between 20 $\mu$m and 140 $\mu$m from the substrate carrying the electron-emitting device.

17. A method of manufacturing an image-forming apparatus according to claim 16, wherein the substrate is prepared by subjecting a sodium-containing glass to a treatment in which sodium is deposited on the surface of the glass as sulfate.

18. A method of manufacturing an image-forming apparatus according to claim 16, wherein the sodium concentration on the surface of the substrate carrying the electron-emitting devices is not greater than 2%.

19. A method of manufacturing an image-forming apparatus according to claim 16, wherein the step of binding components of the image-forming apparatus is carried out at a temperature between 400° C. and 500° C. for a treatment time between 600 sec. and 1200 sec.

20. A method of manufacturing an image-forming apparatus according to claim 16, wherein the substrate comprises a phosphor containing layer on the surface carrying the electron-emitting devices.

21. Method of manufacturing an image-forming apparatus according to claim 20, wherein the phosphor concentration of the phosphor containing layer of the substrate is in the range of between 3% and 10%.

22. A method of manufacturing an image-forming apparatus comprising a substrate, electron-emitting devices arranged on the surface of the substrate and an image-forming member for forming images as irradiated with electrons emitted from the electron-emitting devices, comprising a step of forming the electron-emitting devices on the substrate that contains sodium, the sodium concentration of the substrate being reduced in the vicinity of the surface carrying the electron-emitting devices as compared to the bulk body of the substrate, wherein a layer with a composition such that sodium is partially replaced by potassium based on the composition of the bulk body of the substrate is formed to constitute the surface carrying the electron-emitting devices.

23. A method of manufacturing an image-forming apparatus comprising a substrate, electron-emitting devices arranged on the surface of the substrate and an image-forming member for forming images as irradiated with electrons emitted from the electron-emitting devices, comprising a step of forming the electron-emitting devices on the substrate that contains sodium, the sodium concentration of the substrate being reduced in the vicinity of the surface carrying the electron-emitting devices as compared to the bulk body of the substrate, wherein the substrate further contains sulfur and a layer with a sulfur concentration smaller than that of the bulk body of the substrate is formed to a depth greater than 0.01 $\mu$m from the surface carrying the electron-emitting device, the sulfur concentration of the layer being not greater than 0.1%.

24. A method of manufacturing an image-forming apparatus according to any of claims 16 through 18 and 19 through 22, wherein each of said electron-emitting devices comprises an electroconductive film including an electron-emitting region and arranged between a pair of device electrodes.

25. A method of manufacturing an image-forming apparatus according to claim 23, wherein the substrate is prepared by subjecting a sodium-containing glass to a treatment in which sodium is deposited on the surface of the glass as sulfate.

26. A method of manufacturing an image-forming apparatus according to claim 23, wherein the sodium concentration on the surface of the substrate carrying the electron-emitting devices is not greater than 2%.

27. A method of manufacturing an image-forming apparatus according to claim 23, wherein the method further comprises a step of binding components of the image-forming apparatus and a layer with a sodium concentration smaller than that of the bulk body of the substrate is formed to a depth between 20 $\mu$m and 140 $\mu$m from the substrate carrying the electron-emitting devices.

28. A method of manufacturing an image-forming apparatus according to claim 27, wherein the step of binding components of the image-forming apparatus is carried out at a temperature between 400° C. and 500° C. for a treatment time between 600 sec. and 1200 sec.

29. A method of manufacturing an image-forming apparatus according to claim 23, wherein the substrate comprises a phosphor containing layer on the surface carrying the electron-emitting devices.

30. A method of manufacturing an image-forming apparatus according to claim 29, wherein the phosphor concentration of the phosphor containing layer of the substrate is in the range of between 3% and 10%.

31. A method of manufacturing an image-forming apparatus according to claim 23, wherein a layer with a composition such that sodium is partially replaced by potassium based on the composition of the bulk body of the substrate is formed to constitute the surface carrying the electron-emitting device.

* * * * *

UNITED STATES PATENT AND TRADEMARK OFFICE
CERTIFICATE OF CORRECTION

PATENT NO. : 6,299,497 B1
DATED : October 9, 2001
INVENTOR(S) : Michiyo Nishimura et al.

It is certified that error appears in the above-identified patent and that said Letters Patent is hereby corrected as shown below:

Column 1,
Line 33, "An" should read -- A --.

Column 13,
Line 31, "an" should read -- a --.

Column 15,
Line 47, "by" should be deleted.

Column 19,
Line 61, "a" should read -- to a --.

Column 22,
Line 58, "an" should read -- a --.

Column 28,
Line 44, "of" should be deleted.

Column 30,
Line 44, "a" should read -- an --.

Column 33,
Line 18, "r ate" should read -- rate --.
Line 38, "example" should read -- example were --.
Line 54, "and" should read -- an --, and "an" should read -- and --.

Column 34,
Line 59, "that" should be deleted.

Signed and Sealed this

Thirty-first Day of December, 2002

JAMES E. ROGAN
*Director of the United States Patent and Trademark Office*